Figure 1:
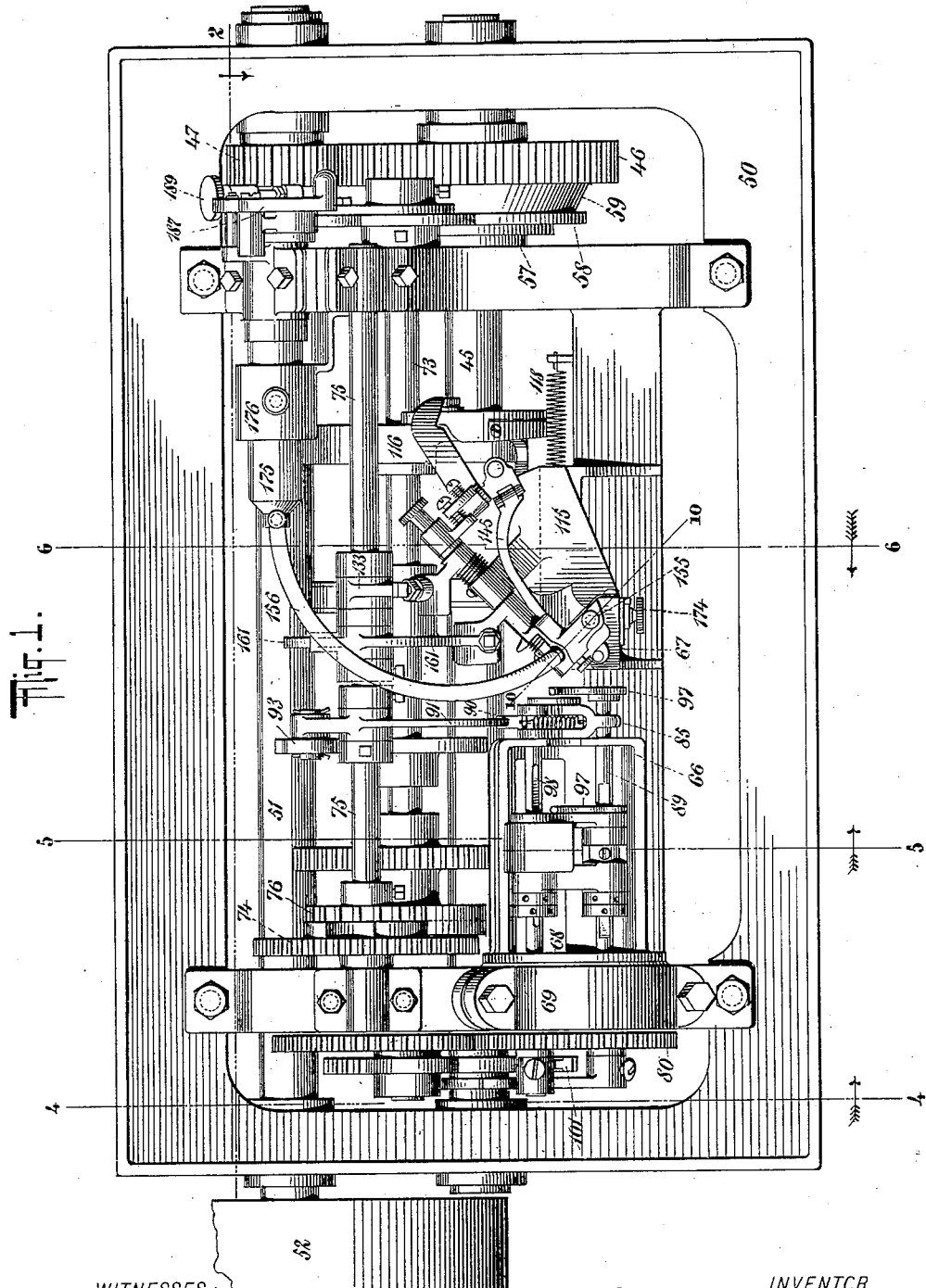

No. 633,579. Patented Sept. 26, 1899.
J. W. DUNN.
CIGAR MAKING MACHINE.
(Application filed Mar. 21, 1899.)

(No Model.) 11 Sheets—Sheet 1.

WITNESSES:

INVENTOR
John W. Dunn,
BY
Chas. C. Gill
ATTORNEY.

No. 633,579. Patented Sept. 26, 1899.
J. W. DUNN.
CIGAR MAKING MACHINE.
(Application filed Mar. 21, 1899.)
(No Model.) 11 Sheets—Sheet 4.

WITNESSES:
Gustave Dieterich
John Kehlenbeck.

INVENTOR
John W. Dunn,
BY
Chas. C. Gill
ATTORNEY.

THE NORRIS PETERS CO., PHOTO-LITHO., WASHINGTON, D. C.

No. 633,579. Patented Sept. 26, 1899.
J. W. DUNN.
CIGAR MAKING MACHINE.
(Application filed Mar. 21, 1899.)

(No Model.) 11 Sheets—Sheet 5.

WITNESSES:
Gustave Dieterich.
John Kehlenbeck.

INVENTOR
John W. Dunn,
BY
Chas. C. Gill
ATTORNEY

THE NORRIS PETERS CO., PHOTO-LITHO., WASHINGTON, D. C.

No. 633,579. Patented Sept. 26, 1899.
J. W. DUNN.
CIGAR MAKING MACHINE.
(Application filed Mar. 21, 1899.)
(No Model.) 11 Sheets—Sheet 6.
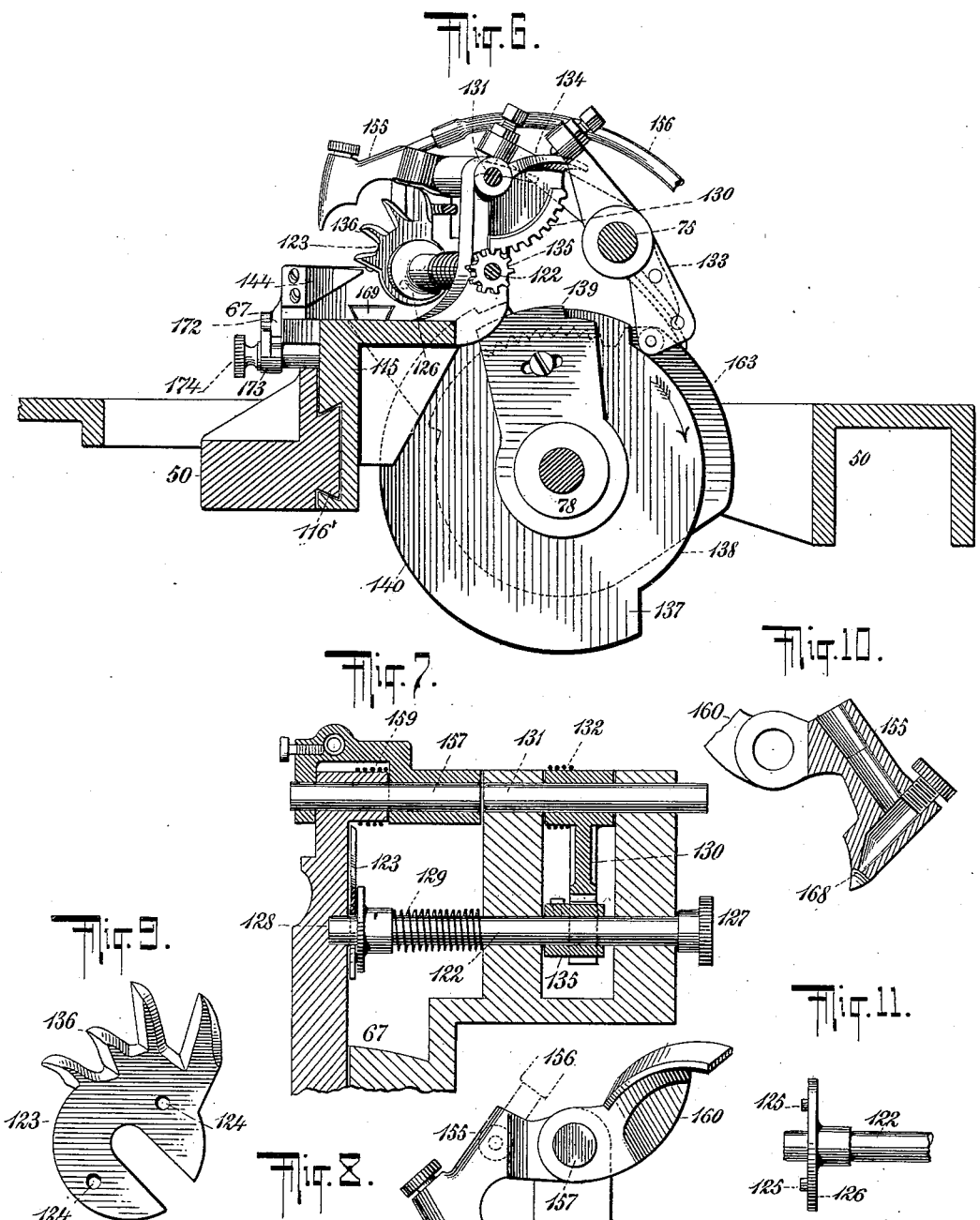
WITNESSES: INVENTOR
John W. Dunn,
BY
ATTORNEY No. 633,579. Patented Sept. 26, 1899.
J. W. DUNN.
CIGAR MAKING MACHINE.
(Application filed Mar. 21, 1899.)
(No Model.) 11 Sheets—Sheet 7.
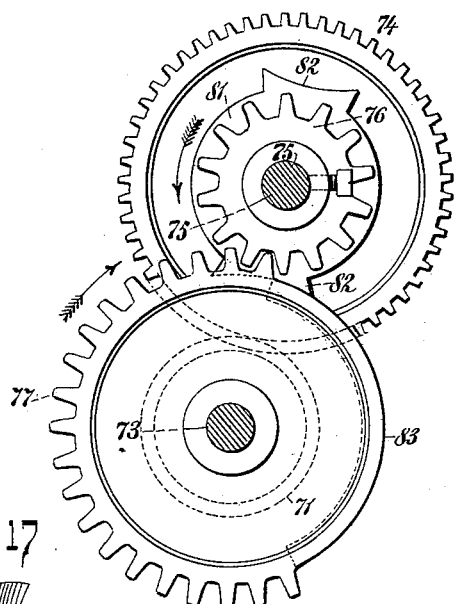
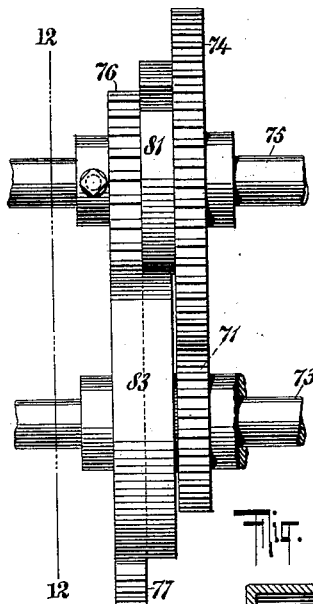
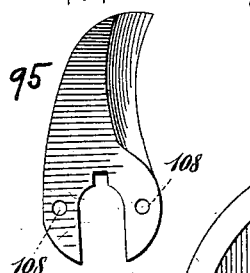
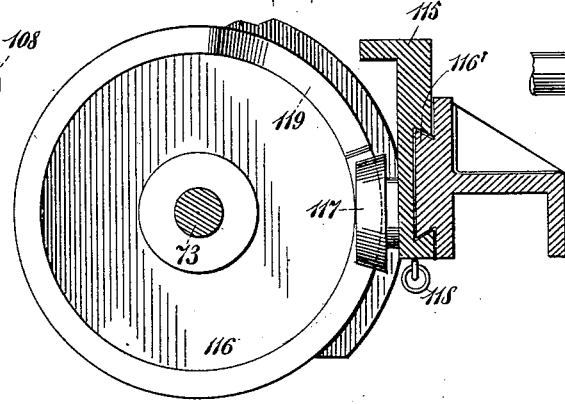
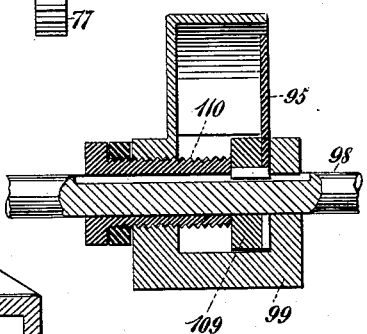
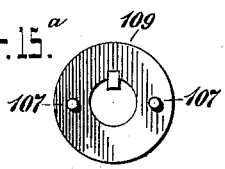
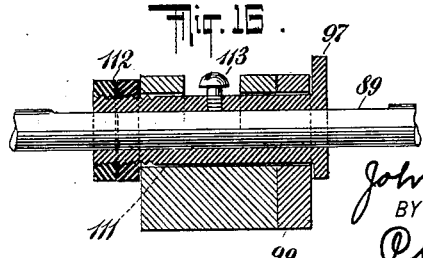
WITNESSES:
Gustave Dieterich
John Kehlenbeck
INVENTOR
John W. Dunn
BY
Chas. C. Gill
ATTORNEY
THE NORRIS PETERS CO., PHOTO-LITHO., WASHINGTON, D. C.

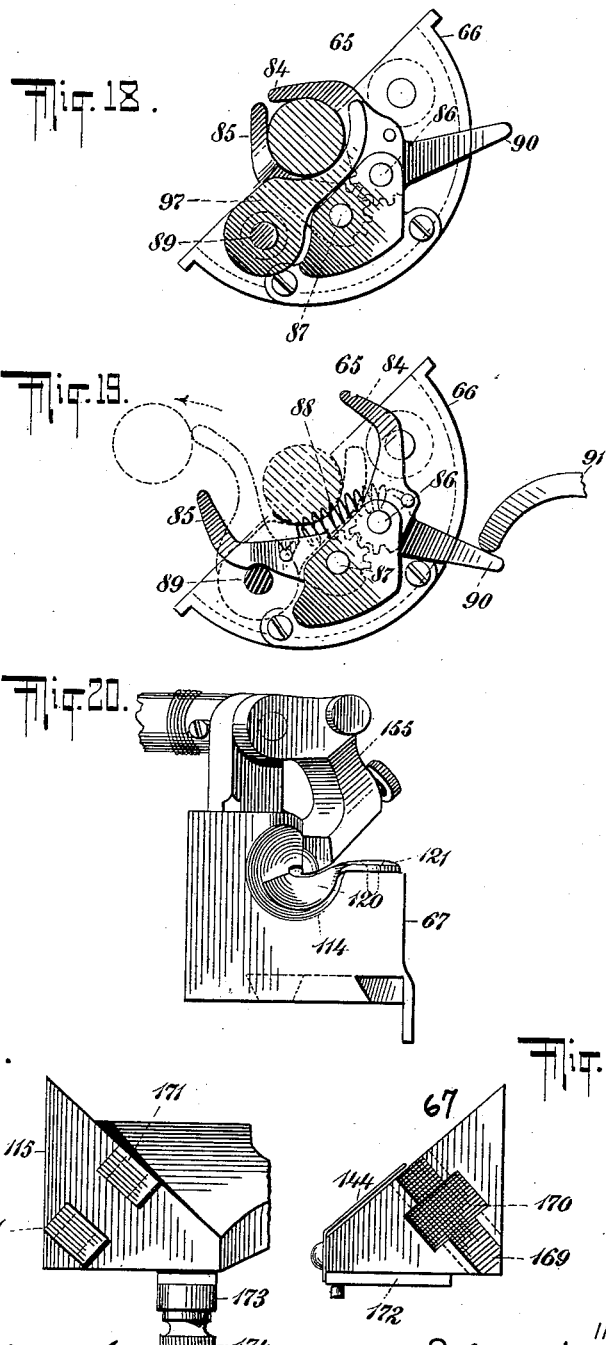

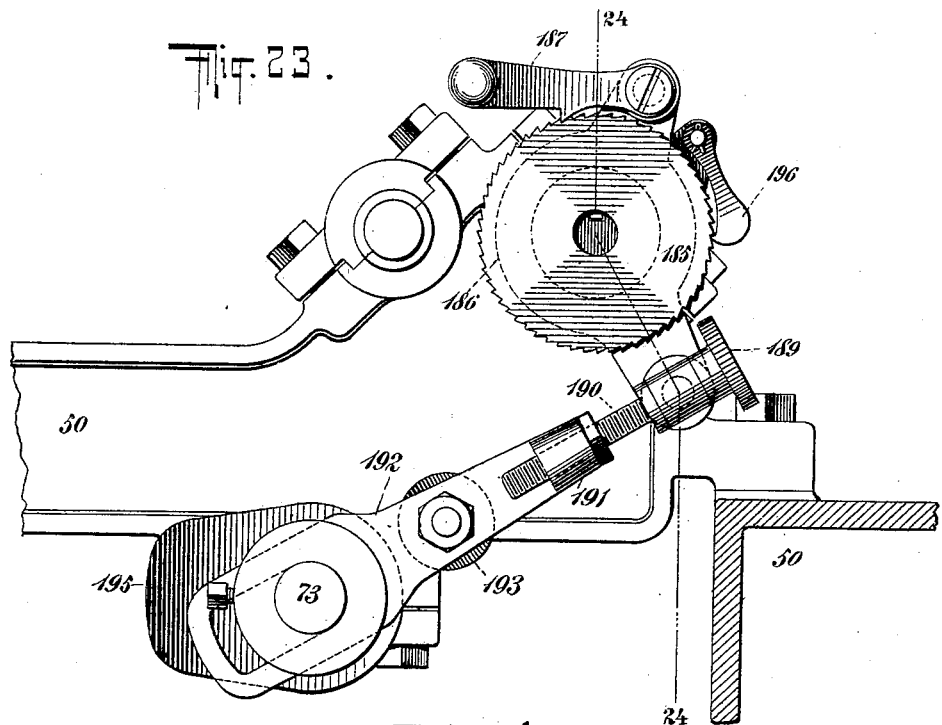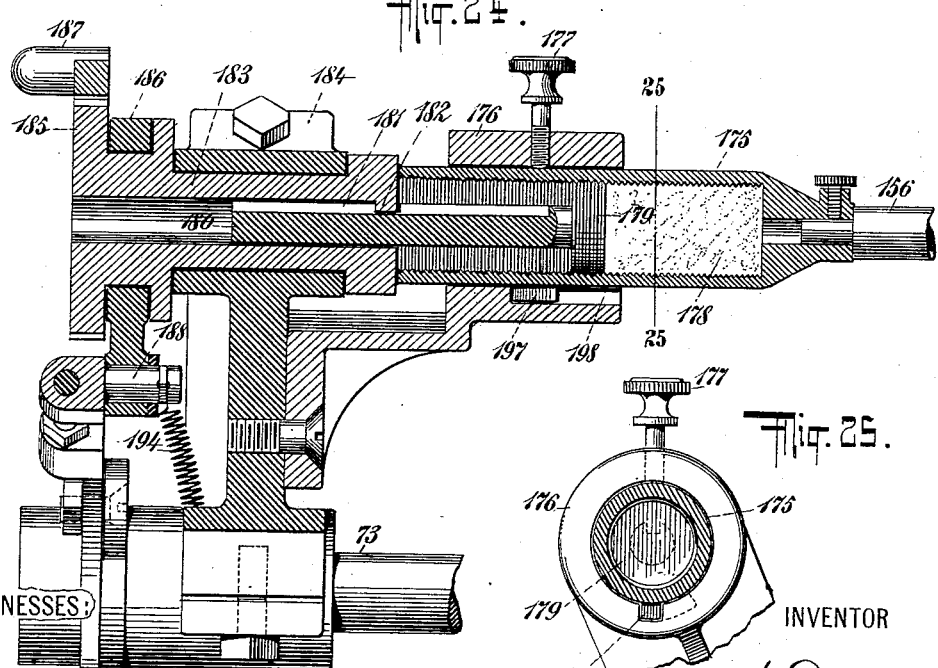

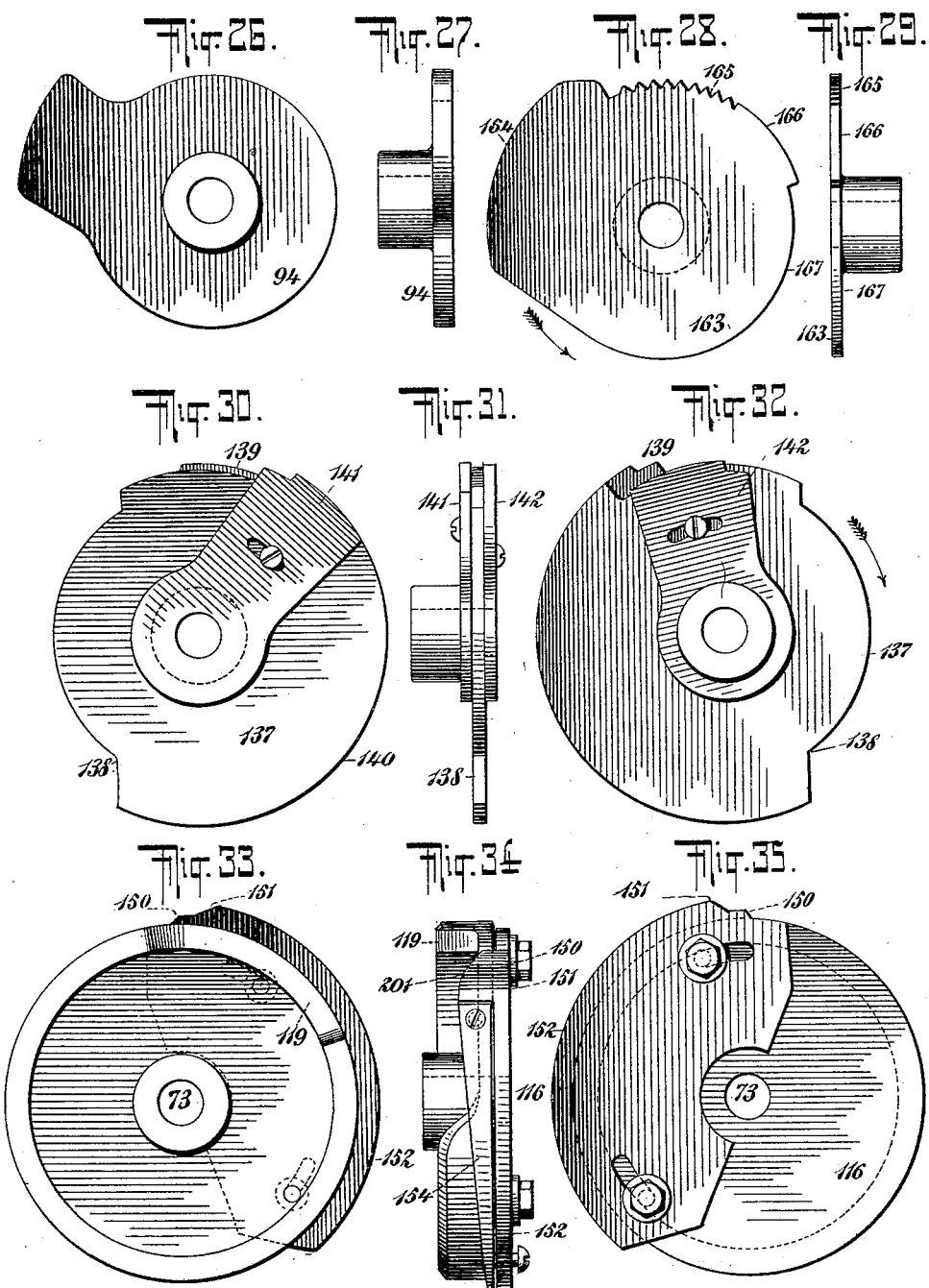

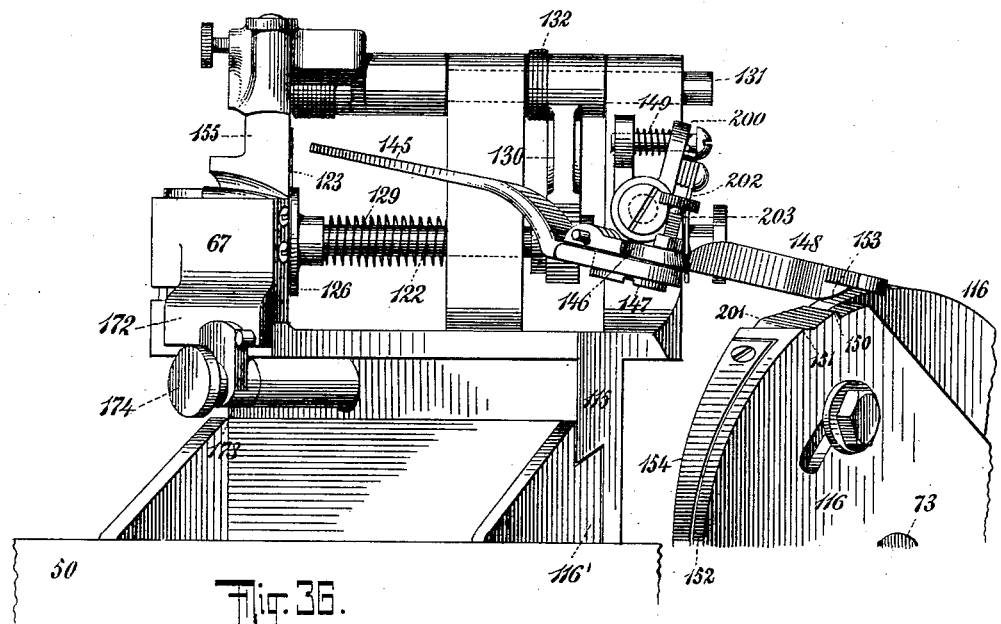

UNITED STATES PATENT OFFICE.

JOHN W. DUNN, OF NEWARK, NEW JERSEY, ASSIGNOR TO THE JOHN R. WILLIAMS COMPANY, OF NEW YORK, N. Y.

CIGAR-MAKING MACHINE.

SPECIFICATION forming part of Letters Patent No. 633,579, dated September 26, 1899.

Application filed March 21, 1899. Serial No. 709,906. (No model.)

*To all whom it may concern:*

Be it known that I, JOHN W. DUNN, a citizen of the United States, and a resident of Newark, in the county of Essex and State of New Jersey, have invented certain new and useful Improvements in Cigar-Making Machines, of which the following is a specification.

The invention relates to improvements in cigar-making machines, and particularly to machines for forming the head end of cigars.

In accordance with my invention the cigar after having been wrapped and while the end of the wrapper is loose and projecting from the end of the cigar ready to be finally applied and the head of the cigar finished in the usual manner is introduced to the machine made the subject hereof, and the said projecting end of the wrapper is by means of said machine and without the employment of hand labor applied to the end of the cigar and the latter finished to completion.

I have termed the machine made the subject hereof a "cigar-heading machine," since, as above indicated, the wrapper is applied by any of the usual methods to the body of the cigar, leaving the end of the wrapper loose at the head of the cigar, and the head of the cigar is then completed by said machine.

I have embodied my invention in the machine shown in the accompanying drawings, said machine comprising a rotatory frame having a clamp in which the cigar to be finished or headed is placed, a thimble having a cone-shaped recess to receive the head end of the cigar held by the said clamp, a knife for trimming the projecting portion of the leaf at the head end of the cigar, pasting devices for properly applying an adhesive substance to the leaf in order to secure it permanently in place, means for trimming the tuck end of the cigar, means for ejecting the cigar from the said rotatory frame after the cigar has been completed, and operative mechanism for actuating the various parts hereinbefore referred to.

The object of the invention is to diminish the time, labor, and expense incident to finishing the heads of cigars and to produce a machine which will automatically and perfectly finish the cigars, the latter when ejected from the machine being ready for the market.

The invention will be fully understood from the detailed description hereinafter presented, reference being had to the accompanying drawings, in which—

Figure 2:
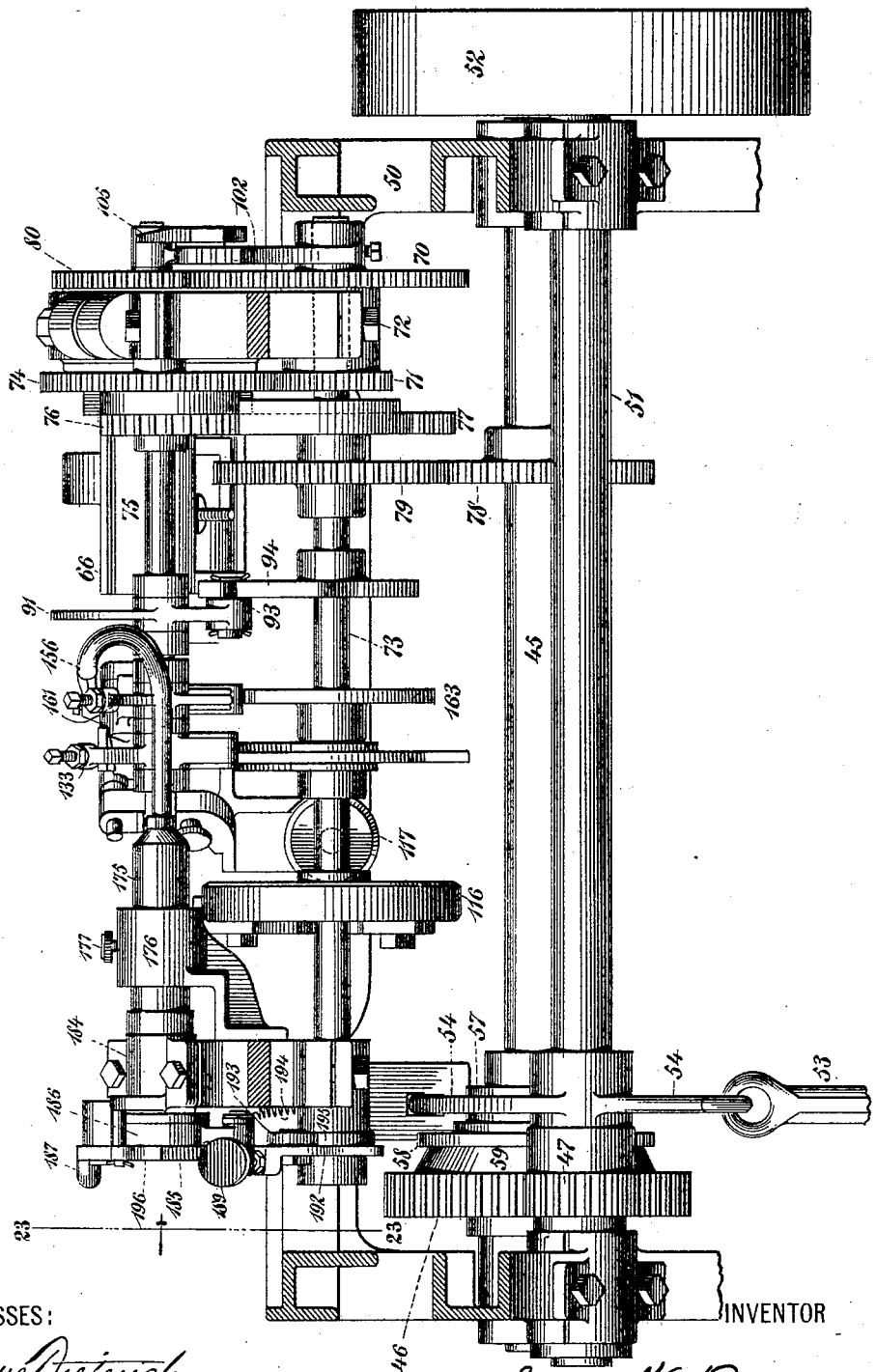
Figure 3:
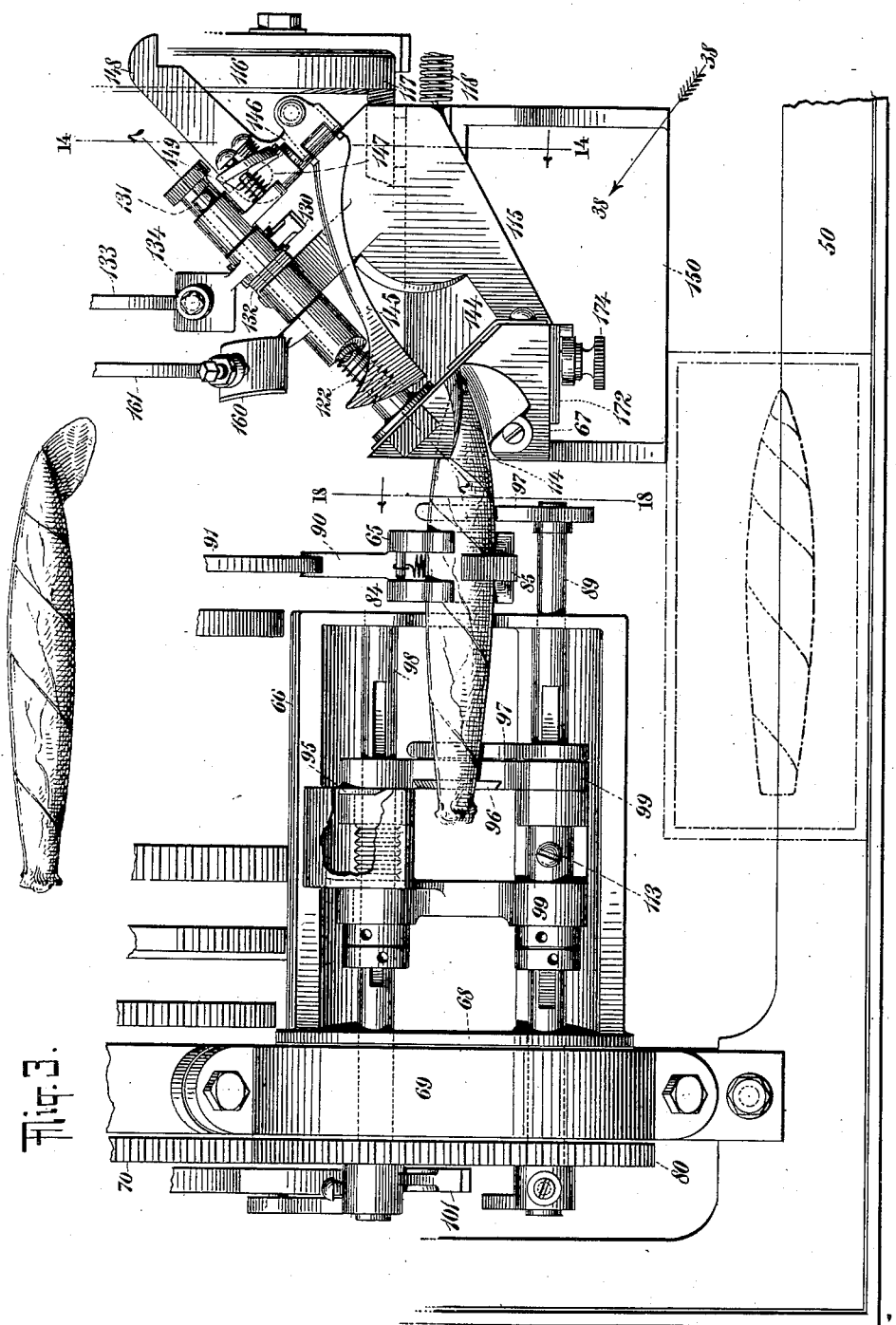
Figure 4:
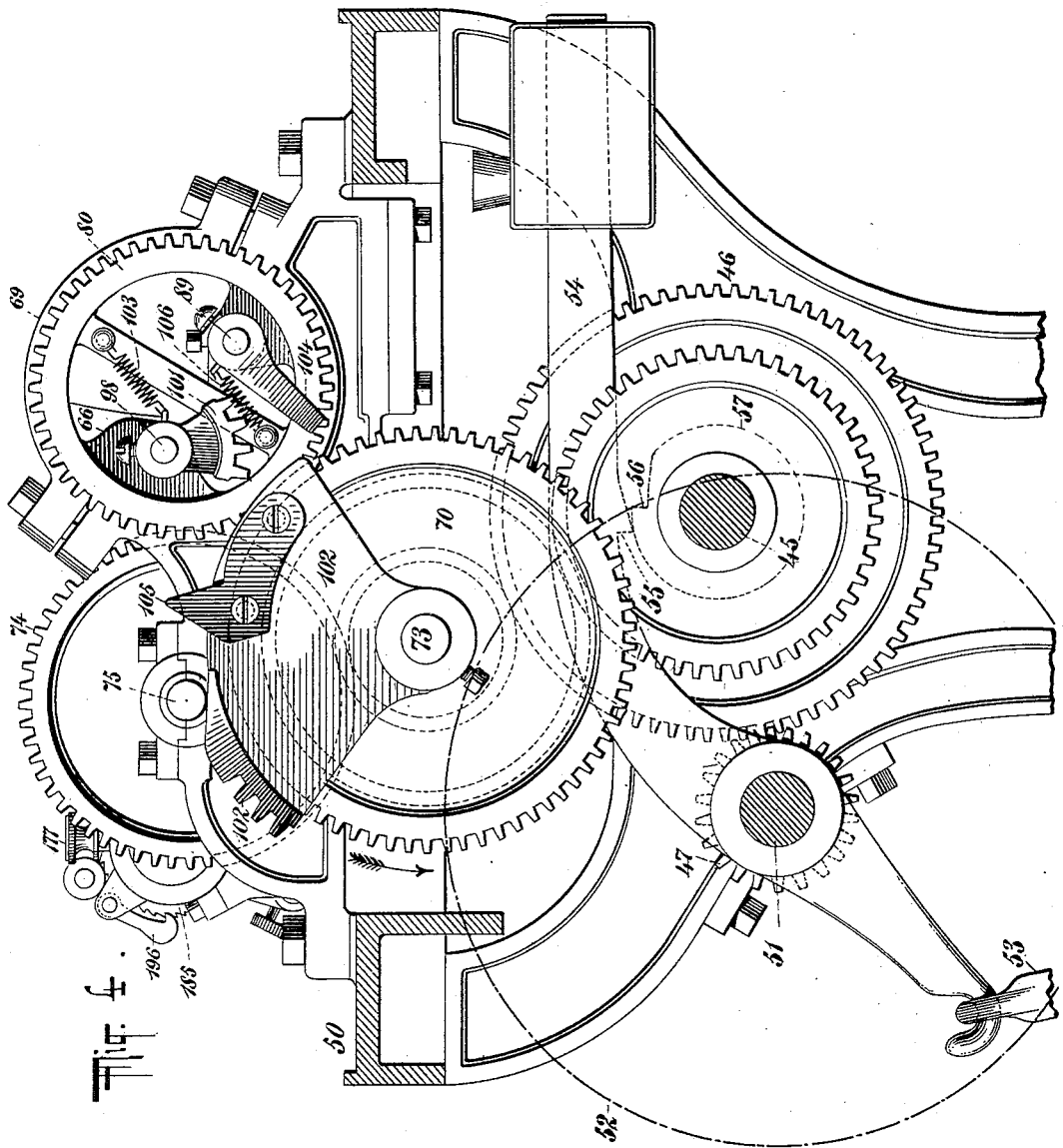
Figure 5:
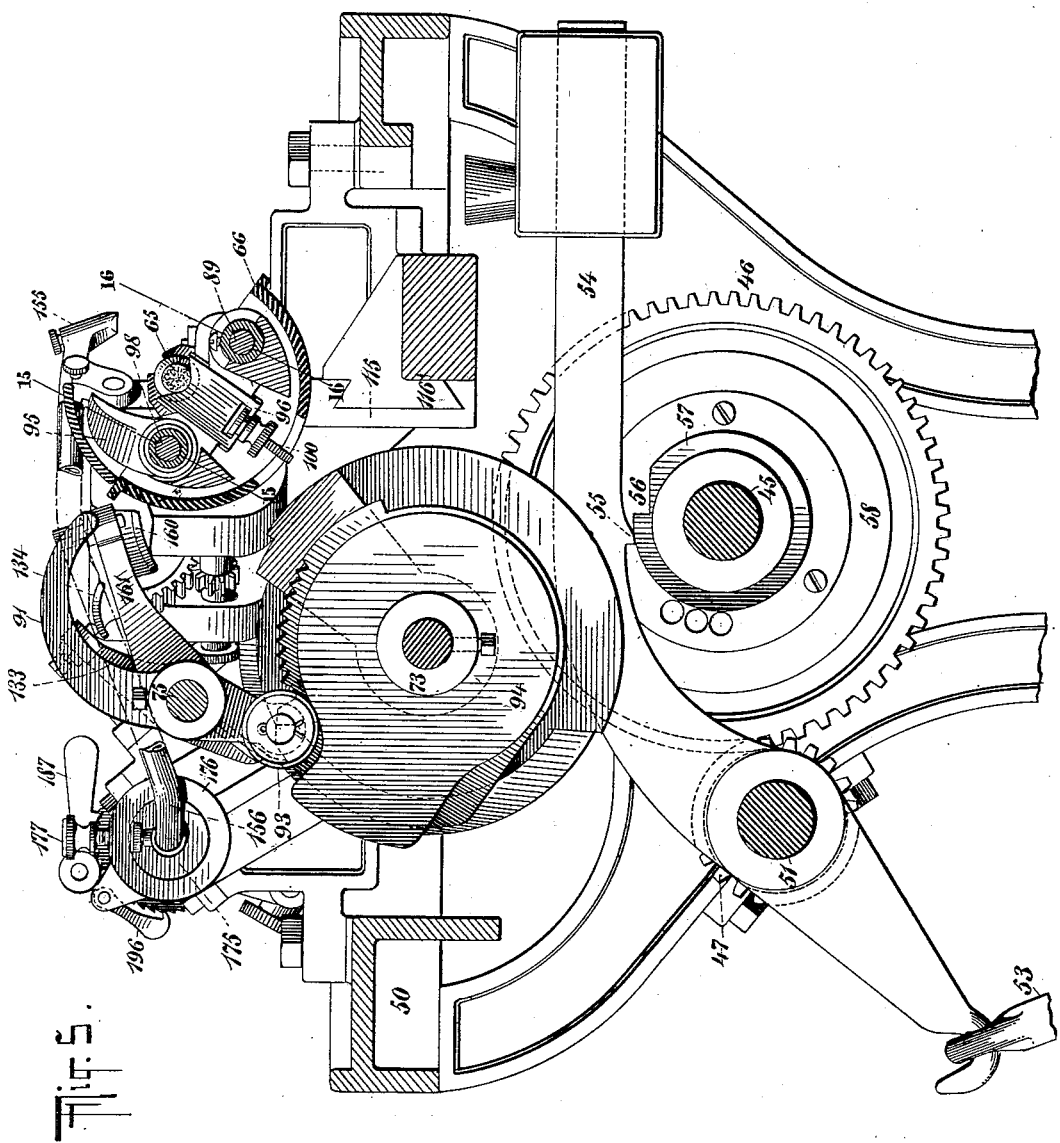

Figure 1 is a top view of a machine constructed in accordance with and embodying the invention. Fig. 2 is a vertical longitudinal section of same on the dotted line 2 2 of Fig. 1. Fig. 3 is an enlarged top view of a portion of the machine and more particularly that portion which is more directly brought into contact with the cigar under treatment. This figure illustrates the cigar to be headed as detached from the machine and as clamped by the machine and as having been ejected in its completed state from the machine. Fig. 4 is a vertical transverse section of the machine on the dotted line 4 4 of Fig. 1. Fig. 5 is a like section of same on the dotted line 5 5 of Fig. 1. Fig. 6 is a like section through a portion of the machine on the dotted line 6 6 of Fig. 1. Fig. 7 is an enlarged vertical section through a portion of the machine on the dotted line 7 7 of Fig. 3. Fig. 8 is an enlarged end view of the outer or right-hand end of the thimble, within which the head of the cigar is formed. Fig. 9 is a detached side elevation of the knife having the several cutters or blades by which the surplus wrapper overhanging the outer edge of the thimble is severed. Fig. 10 is a longitudinal section on the dotted line 10 10 of Fig. 1 of that portion of the machine termed herein a "hammer-arm" and pivotally connected with the thimble and through which the paste is applied upon the wrapper. Fig. 11 is an enlarged detached side elevation of a portion of the shaft and disk illustrated in Fig. 7 by which the knife shown in Fig. 9 is held in place. Fig. 12 is a side elevation, partly in section, of a portion of the gear mechanism hereinafter described. Fig. 13 is an edge view of same and indicates by the dotted line 12 12 the section on which Fig. 12 is taken. Fig. 14 is an enlarged vertical transverse section through a portion of the operative mechanism, taken on the dotted line 14 14 of Fig. 3 and illustrates more particularly the cam for moving the carriage carrying the thimble toward the cigar-clamp. Fig. 15 is a vertical longitudinal section through a portion of the operative mechanism, taken on dotted line 15 15 of Fig. 5 and illustrates more especially the tuck cutter or knife and the means for securing it in place. Fig. 15a is a detached face view of the plate for locking the tuck-cutting knife in position. Fig. 16 is a like view of a portion of the operative mechanism, taken on the dotted line 16 16 of Fig. 5 and shows a portion of the ejector-rod and parts thereon. Fig. 17 is a detached side elevation of the cutter employed for trimming the tuck end of the cigar after the latter has been rolled to completion. Fig. 18 is a detached vertical transverse section through a portion of the machine on the dotted line 18 18 of Fig. 3 and illustrating more particularly the clamp for holding the cigar and the ejector for ejecting the finished cigar. This figure illustrates the clamp in its closed position holding the cigar. Fig. 19 is a view substantially corresponding with Fig. 18, but illustrating the clamp in its open position and the cigar as having been ejected from between the members of the clamp by the ejector. Fig. 20 is a detached view looking inward into the thimble within which the head end of the cigar is held while the loose portion of the wrapper is being applied thereto. Fig. 21 is a top view of that portion of the carriage on which the thimble is mounted. Fig. 22 is a bottom view of the said thimble. Fig. 23 is an enlarged vertical transverse section on the dotted line 23 23 of Fig. 2, looking inward at the left-hand end of the machine toward the mechanism for operating the pasting appliances. Fig. 24 is a vertical section of the pasting mechanism on the dotted line 24 24 of Fig. 23. Fig. 25 is a vertical transverse section through the pasting-cylinder on the dotted line 25 25 of Fig. 24. Figs. 26 to 35, inclusive, are enlarged detailed views of several of the operative cams of the machine and will be specifically referred to hereinafter. Figs. 36 and 37 are detached elevations of the inner or facing sides of the parts of the clutch mechanism by which the motion of the main power-shaft is communicated to or cut off from the auxiliary driving-shaft; and Fig. 38 is an enlarged elevation, looking in the inclined direction of the arrow line 38 38 of Fig. 3, of the parts connected with the carriage which carries the thimble and its coöperating parts.

In the drawings, 50 denotes the main frame and supporting-bed of the machine, 51 the main power-shaft, and 52 the usual belt-wheel, by which power may be applied to the shaft 51 and from said shaft to the operative parts of the machine. Parallel with the power-shaft 51 is arranged an auxiliary driving-shaft 45, upon which is loosely mounted a gear-wheel 46, which is in constant mesh with the pinion-wheel 47, rigidly mounted upon the driving-shaft 51. The motion of the power-shaft 51 is communicated through the pinion-wheel 47, gear-wheel 46, and suitable clutch mechanism to the auxiliary driving-shaft 45. The shaft 45 is provided with clutch mechanism of any suitable character which will automatically cut off the power of the belt-wheel 52 and shaft 51 from the shaft 45 at the end of each revolution of the latter. The machine will also be provided with a treadle, not shown, but connected to the pitman-rod 53, (see Figs. 2, 4, and 5,) for effecting the engagement of the clutch and the consequent starting of the shaft 45 whenever desired. Clutch mechanism for stopping the shaft 45 at the end of each of its revolutions and the treadle for again starting the shaft 45 are well known in this art, and this invention is not limited to any special means for stopping or starting the shaft 45. In the drawings, however, I illustrate a suitable clutch-and-treadle mechanism, and the same is shown more particularly in Figs. 2, 4, 5, 36, and 37, in which it will be seen that the treadle pitman-rod 53 is connected with the weighted lever-arm 54 and that said arm is formed with the detent 55, adapted to engage the recess 56, formed in the periphery of the disk 57, secured upon the auxiliary driving-shaft 45. When the detent 55 is within the recess 56, it will lock the disk 57 and shaft 45 stationary; but when by the pressure of the foot upon the treadle (not shown) the upper weighted end of the lever-arm 54 is elevated the disk 57 and shaft 45 may make a complete rotation until the recess 56 again reaches the position in which it will be engaged by the detent 55 and becomes thereby arrested. After the detent 55 is elevated from the recess 56 the foot of the operator will be removed from the treadle, and the detent 55 will then ride upon the periphery of the disk 57 until it again engages the recess 56 of said disk. The disk 57 is fastened by screws, as shown in Figs. 1, 5, and 37, to the disk 58, which is in close relation to the gear-wheel 46, and the clutch mechanism proper is intermediate the disk 58 and the gear-wheel 46, and the details of the clutch mechanism apart from the lever 54 are illustrated in Figs. 36 and 37, Fig. 36 representing an interior view of the clutch mechanism looking toward the gear-wheel 46 and Fig. 37 being a view looking toward that side of the disk 58 which faces the gear-wheel 46. The gear-wheel 46 is formed with the annular collar or shoulder 59, inclosing the three-armed or triangular block 60, keyed upon the auxiliary driving-shaft 45 and supporting at the intersecting portions of its arms the pivotally-mounted wedges or dogs 61, whose outer curved surfaces are normally held in contact with the inner surfaces of the rim or collar 59 by reason of the tension of the springs 62, as shown in Fig. 36. The gear-wheel 46 is loosely mounted upon the shaft 45, and the block 60 is keyed upon said shaft, and in their normal condition under the tension of the springs 62 the wedges 61 contact with the rim 59 of said gear-wheel 46 and serve when in the position shown in Fig. 36 to effect the rotation of said wheel 46, block 60, and shaft 45 simultaneously. When the wedges 61 are pressed toward the springs 62, their outer edges are freed of the rim 59 of the gear-wheel 46, and at such time the gear-wheel 46 may rotate under the influence of the power-shaft 51 and pinion-wheel 47, but will not at such time impart its motion to the auxiliary driving-shaft 45. The means for moving the wedges 61 toward their springs 62 are illustrated in Fig. 37 and consist simply of the three arms 63, extending from the face of the disk 58 inward within the spaces 64 adjacent to that side of the wedges 61 opposite to their springs 62. The arms 63 have springs 49 to contact with the wedges 61. As above described, the disk 58 is secured to the recessed disk 57, and hence said disk 58 is, with the disk 57, adapted to be stopped at the end of each of its rotations by the engagement of the detent 55 with the recess 56, formed in said disk 57, and when thus stopped the arms 63 of said disk 58 will afford a barrier to the continued rotation of the block 60 by obstructing the onward motion of the wedges 61, and thereby compelling said wedges 61 to recede toward their springs 62 and leave the inner surfaces of the rim 59, forming a part of the gear-wheel 46, under which condition of the wedges 61 the gear-wheel 46 may continue to rotate under the influence of the power-shaft 51 and pinion-wheel 47, but will not communicate its motion to the block 60 and auxiliary driving-shaft 45. Thus it will be apparent that the power-shaft 51 has a continuous motion imparted to it from the belt-wheel 52 and that the gear-wheel 46 will have a continuous motion with said power-shaft 51 and its pinion-wheel 47, but that at the end of each rotation of the auxiliary driving-shaft 45 the latter will be brought to a stop by the automatic engagement of the detent 55 with the recess 56 of the disk 57, said engagement of said detent with said recess acting to check the disk 57 and disk 58 and arrest the arms 63, carried by said disk 58, in such position that the wedges 61 will move against them and be thereby freed from the rim 59 of the gear-wheel 46, leaving the latter to rotate freely upon the auxiliary driving-shaft 45 without actuating said shaft. When the detent 55 of the lever 54 is riding upon the edge of the recessed disk 57, the arms 63, carried by the disk 58, do not afford sufficient resistance to the wedges 61 to turn them from the rim 59, and consequently said arms 63 have at such time no effect upon the wedges 61 and travel with said wedges. The arms 63 only affect the wedges 61 when said arms are arrested, and the wedges 61 are moved against them, with the result of causing said wedges to turn upon their pivotal bearings and free themselves from the rim 59 of the gear-wheel 46. The disk 57 with the disk 58 and arms 63 are automatically arrested at the end of each rotation of the auxiliary driving-shaft 45 by the engagement of the detent 55 with the recess 56, and so long as the detent 55 remains in engagement with the recess 56 the auxiliary driving-shaft 45 will remain at rest, while the power-shaft 51, pinion-wheel 47, and gear-wheel 46 continue in motion. To restart the auxiliary driving-shaft 45, it will simply be necessary for the operator to press upon the foot-treadle (not shown) and thereby elevate the upper weighted end of the arm 54 in order that the detent 55 may pass upward free of the recess 56, formed in the disk 57, this operation resulting in the freeing of the disks 57 58 and relieving the pressure of the arms 63 from the wedges 61, whereby said wedges 61 are permitted to regain their engagement with the rim 59 of the gear-wheel 46, and under such condition of the clutch mechanism the motion of the power-shaft 51 will be communicated to the auxiliary driving-shaft 45.

The cigar to be headed is held within a clamp 65, as shown in Fig. 3, carried by a rotatory semicylindrical frame 66, and while the cigar is being rotated during the rotation of the frame 66 its head end is located within a thimble 67, the latter being stationary, except that at the proper time, as hereinafter described, said thimble is moved toward the frame 66 to receive the head end of the cigar, as shown in Fig. 3, and thereafter upon the completion of the cigar said thimble is moved outward from said frame 66 in order to freely release the finished cigar and permit of the automatic ejection of the same into any suitable receiving trough or box. (Indicated by dotted lines in Fig. 3.)

The rotatory frame 66, carrying the cigar-clamp 65, receives its motion from the auxiliary driving-shaft 45 and makes about four complete rotations during less than one rotation of said shaft 45, the shaft 45 continuing to rotate for a brief period before completing its one rotation and after the frame 66 has ceased to rotate in order that the tuck end of the cigar may be trimmed, the thimble 67 moved outward from the head end of the cigar, the cigar-clamp 65 opened, and the ejector acted to dislodge the finished cigar from the clamp 65 and discharge it into the receiving-receptacle. (Shown by dotted lines in Fig. 3.)

It has been described above that the auxiliary driving-shaft 45 receives its motion from the power-shaft 51, and I will now proceed to describe the rotatory frame 66 and the means for imparting to said frame about four rotations during less than one rotation of the auxiliary driving-shaft 45, from which it receives its motion.

The rotatory frame 66 is semicylindrical, and at its outer end is formed with a head 68, mounted to rotate within the bearing 69 and provided with the gear-wheel 80, as shown in Figs. 1, 2, 3, and 4. The gear-wheel 80, carried by the frame 66, is in constant engagement with the gear-wheel 70, connected by a sleeve with a pinion-wheel 71, and said sleeve is mounted within the bearing 72 (see Fig. 2) and upon the shaft 73. The wheel 70 and pinion-wheel 71 therefore rotate together, and the pinion-wheel 71 receives its motion from the gear-wheel 74, mounted upon the shaft 75, which does not have a continuous motion, but which receives its motion from the pinion-wheel 76, (see Figs. 2, 12, and 13,) which is integral with said gear-wheel 74 and rigid on the shaft 75 and obtains its motion from the segment-gear 77, rigidly mounted upon the shaft 73 adjacent to the pinion-wheel 71, (see Fig. 2,) which is free upon said shaft 73. The segment-gear 77 being rigid upon the shaft 73 receives its motion from said shaft and said shaft 73 receives its motion from the auxiliary driving-shaft 45 (see Fig. 2) through the intermediate and intermeshing gear-wheels 78 and 79. Thus the motion of the auxiliary driving-shaft 45 is communicated through the gear-wheels 78 and 79 to the shaft 73, and the rotary motion of the shaft 73 is communicated through the segment-gear 77 to the pinion-wheel 76 and gear-wheel 74 and by the latter to the pinion-wheel 71 and gear-wheel 70, which is in direct engagement with the gear-wheel 80, directly upon the head 68 of the rotatory frame 66. It will therefore be apparent that during all such time as the segment-gear 77 is in engagement with the pinion-wheel 76 the rotatory frame 66 will be enabled to have its movement. When the segment-gear 77 passes from engagement with the said pinion-wheel 76, the latter and the gear-wheel 74 will cease to rotate, and hence it will be apparent that at such time the pinion-wheel 71 and gear-wheel 70 will cease their movement and fail to operate the rotatory frame 66 through gear-wheel 80. In order that the rotatory frame 66 may be rigidly held at the end of its proper movement and not be affected by momentum or otherwise, I provide, rigid with and intermediate the pinion-wheel 76 and gear-wheel 74, the locking-plate 81, which when the segment-gear 77 leaves its engagement with the pinion 76 will cause one of its plain curved surfaces 82 to engage the corresponding plain surface 83 of the segment-gear 77, and thus during the continued motion of the shaft 73 and segment-gear 77 (after said gear has left the pinion-wheel 76) the plain surface 83 of said gear, riding against the curved surface 82 of the locking-plate 81, will in conjunction with said plate 81 prevent the rotation of the shaft 75, pinion-wheel 76, and gear-wheel 74, and while the plain surface 83 of the segment-gear 77 is moving against said surface 82 of the locking-plate 81 the rotatory frame 66 will be locked stationary in its normal position. While the segment-gear 77 is acting upon the pinion-wheel 76 the rotatory frame 66 will make about four complete rotations, and after the segment-gear 77 leaves the pinion-wheel 76 the rotatory frame 66 will be at rest, but the shaft 73 will continue to complete its rotation for the purpose of actuating certain other portions of the mechanism hereinafter described, which are timed to operate after the frame 66 has come to a stop.

The movement of the rotatory frame 66 and the mechanism by which said movement is affected having been thus described I will proceed to describe the operative parts more directly connected with said rotatory frame 66 together with the means by which said parts are operated, and first I will refer to the clamp 65 for holding the body of the cigar, as shown in Fig. 3. The clamp 65 is carried by the rotatory frame 66 and is illustrated probably more clearly in Figs. 18 and 19. One of the main objects of the special clamp 65 shown is to insure the even, uniform, and central clamping of the cigar-body whether the cigar be of greater or less diameter, and to this end the said clamp is formed of two jaws 84 85, the former being bifurcated, as shown in Fig. 3, to receive, when necessary, (as owing to the smallness of the diameter of the cigar,) the jaw 85 and to permit of the pressure of the jaw 85 to be applied centrally with the jaw 84. The jaws 84 85 are mounted upon the pins 86 87, as shown in Figs. 18 and 19, and the adjacent portions of the shank ends of said jaws 84 85 are toothed and intermesh, so that said jaws 84 85 must move together and apart simultaneously and with an equal degree of motion, thus equalizing their movement and causing them always to approach a central point represented by a longitudinal line through the cigar. The normal position of the jaws 84 85 is that when they are open, as shown in Fig. 19, and said jaws are caused to close together under the tension of the spring 88, connecting them. The jaws 84 85 are prevented from opening unduly under all circumstances owing to the fact that the jaw 85 when opened to its widest extent will contact with the ejector-rod 89, carried by the frame 66 and more fully referred to hereinafter. The jaws 84 85 automatically close under the tension of the spring 88 and must be opened by a positive force to receive the cigar to be held by them, and therefore upon the upper jaw 84 is provided the projecting arm 90, which at the proper time is acted upon by an arm 91, mounted upon the shaft 75 and carrying at its lower end a roller 93, (see Fig. 2,) which is adapted to be engaged by the cam 94, secured upon the shaft 73. The cam 94 is shown in side elevation in Fig. 26 and in an edge view in Fig. 27. The rotation of the shaft 73 and cam 94 operates to elevate the lower end of the arm 91, and consequently to depress the upper end of said arm downward against the arm 90, connected with the upper jaw 84 of the cigar-clamp, and thus at the starting of the operation of the machine the cigar-clamp is open to receive the cigar, and this is immediately followed by the projecting portion of the cam 94 passing from contact with the lower end of the arm 91 and permitting the upper end of said arm to elevate from the arm 90, the jaws 84 85 then at once closing under the action of the spring 88, which moves the arm 90 upward to its normal position.

When the machine is not in operation and at rest, the timing of the parts is such that the arm 91 is by means of the cam 94 held downward against the arm 90, connected with the jaw 84 of the cigar-clamp, and thus it may be said that in the inoperative position of the machine the jaws 84 85 are held open from one another to receive the cigar. As soon as the machine is set in motion the protruding portion of the cam 94 leaves the arm 91 and permits the spring 88 to close the jaws 84 85 upon the cigar placed between them. When the rotatory frame 66 has completed its rotations, the jaws 84 85 continue to hold the cigar, and in the further rotation of the shaft 73, while the frame 66 remains stationary, the cam 94, acting upon the arm 91 and through said arm upon the clamp-arm 90, opens the jaws 84 85 from the cigar preparatory to the ejection of the latter, and said jaws 84 85 remain in this open position until in the operation of treating another cigar the latter is placed between said jaws and the machine again set in motion, this immediately resulting in the cam 94 releasing the arm 91 and arm 90 and permitting the jaws 84 85 to close upon the cigar.

In addition to being provided with the cigar-clamp 65, comprising the jaws 84 85, hereinbefore specifically described the rotatory frame 66 also carries the cutters 95 96 for trimming the tuck end of the cigar and the ejector-arms 97 97 for ejecting the finished cigar from the frame 66 after the latter has come to a stop, and first I will describe the cutters 95 96. These cutters are illustrated in Figs. 3 and 5, (also see Figs. 15, 15ª, and 17,) in which it will be seen that the cutter 95 is fastened upon the knife-rod 98, which extends lengthwise of the rotatory frame 66 and has its bearings in said frame. The knife-rod 98 is adapted to have a rocking motion, so as to impart to the knife or cutter 95 an oscillating motion. The knife-rod 98 is parallel with the ejector-rod 89, also carried by the frame 66, as shown in Fig. 3, and upon the knife-rod 98 and ejector-rod 89 is mounted the carriage 99, which carries the cutter 96, the latter, as indicated in Figs. 3 and 5, being held in a dovetail groove formed in said carriage 99 and being adjustable vertically therein by means of the adjusting screw and nut 100. (Shown more clearly in Fig. 5.) The knife-rod 98 and ejector-rod 89 are carried by and hence move with the rotatory frame 66. The cutter 96 has no independent movement except during its adjustment by means of the screw and nut 100 and the cutter 95 has an independent motion imparted to it after the rotatory frame 66 comes to a stop, and the means for imparting to the cutter 95 its oscillating motion is shown more clearly in Figs. 2 and 4, in which it will be seen that upon the end of the cutter-rod 98 is secured a segment 101, adapted to be engaged by the teeth of the segment-gear 102, rigidly mounted upon the end of the shaft 73, this segment-gear 102 being adjacent to the gear-wheel 70, but free of said gear-wheel, as shown in Fig. 2. The gear-wheel 70, as above described, comes to a stop simultaneously with the stoppage of the rotatory frame 66, but since the shaft 73 continues to rotate for a brief period after the gear-wheel 70 comes to a stop the segment-gear 102 will continue on its motion after the rotatory frame 66 stops, and during this brief continued motion of the segment-gear 102 the teeth of the segment-gear 102 will engage the segment 101 on the knife-rod 98 and give said rod 98 a partial rotary motion for the purpose of causing the cutter 95 to turn frontward and downward and coöperate with the cutter 96 in trimming off the truck end of the cigar. After the segment-gear 102 leaves the segment 101 the knife-rod 98 and cutter 95 will be restored to their normal position by means of the coiled spring 103. (Shown in Fig. 4.) The normal tension of the spring 103 is to hold the cutter 95 in its open position. (Illustrated in Fig. 5.) Thus after the rotatory frame 66 has come to a stop the segment-gear 102, coacting with the segment 101 and knife-rod 98, will turn the cutter 95 downward and forward to trim the tuck end of the cigar, and this operation is very quickly performed, since there are but few teeth in the segment-gear 102 and segment 101.

After the cutters 95 and 96 have effected the trimming of the tuck end of the cigar the cutter 95, as above explained, is elevated by the spring 103, and thereupon the ejector-arms 97 97 almost immediately operate to eject the finished cigar, said ejector-arms 97 97 only being held from performing their function a sufficient length of time for the clamp-arms 84 85 of the cigar-clamp 65 to open and free the cigar. The ejector-arms 97 97 are shown in Fig. 3 in top view, and their outline in side elevation is presented in Fig. 18, in which it will be seen that the upper portions of the arms 97 are concaved to receive the cigar. Upon reference to Fig. 3 it will be seen that the ejector-arms 97 are secured upon the ejector-rod 89 and that one of said arms 97 is adjacent to the outer side of the cigar-clamp 65 and that the other ejector-arm 97 is adjacent to the carriage 99. Thus the ejector-arms 97 act upon the cigar adjacent to the ends of the latter. The means for operating the ejector-rod 89 in order to cause the ejector-arms 97 to turn upward and forward for the purpose of ejecting the cigar are probably more clearly illustrated in Fig. 4, in which it will be seen that upon the outer end of the ejector-rod 89 is secured the arm 104 and that upon the segment-gear 102 is secured the dog 105. During the rotary motion of the segment-gear 102 and after the latter has operated the cutter 95 and the cigar-clamp 65 has opened the dog 105 will strike the lower end of the arm 104 on the ejector-rod 89 and turn said rod, and thereby move the ejector-arms 97 upward and forward for the purpose of discharging the finished cigar. As soon as the dog 105 passes the arm 104 the spring 106 (shown in Fig. 4) will restore the rod 89 and the ejector-arms 97 97 to their normal position adjacent to the clamp 65 and carriage 99, as shown in Fig. 3.

In order to adapt the cutters 95 96 and the left-hand ejector-arm 97 to the various lengths of cigars, the said ejector-arm 97 and the carriage 99 are made adjustable upon the knife-rod 98 and ejector-rod 89, as indicated in Fig. 3 and in detail in Figs. 15, 15ª, and 16. When shorter cigars than that illustrated are to be treated, the carriage 99 (see Fig. 3) will be moved toward the right-hand end of the rotatory frame 66, and when longer cigars than that illustrated are to be treated the carriage 99, with the cutters 95 and 96 and left-hand ejector 97, will be moved on the rods 98 89 toward the left.

The rotatory frame 66 and the parts carried thereby having now been described, it will be understood that when the cigar to be treated has been placed within the clamp 65 and across the upper portion of the ejector-arms 97 and the machine set in motion the clamp 65 will close upon and hold the cigar, and thereupon the rotatory frame 66 will perform its several rotations and finally come to a stop before the machine itself comes to a rest. After the rotatory frame 66 has come to a stop the next operation, so far as the parts connected with the frame 66 are concerned, is that the cutter 95 will descend and trim off the tuck end of the cigar projecting toward the left over the cutter 96, and the next operation is that the clamp 65 will open and release the now-finished cigar, and thereupon the ejector-arms 97 will eject the finished cigar and return to their normal position. When the clamp 65 opens to release the finished cigar, it will remain open until another cigar has been given to the clamp and the machine set in motion. After the cutter 95 has, coacting with the cutter 96, trimmed off the tuck end of the cigar said cutter 95 will at once return to its open position and remain in this position until another cigar shall have been made ready to be trimmed at its tuck end.

In Fig. 17 I illustrate an enlarged detached view of the cutter 95, and in Fig. 15 I present an enlarged sectional view of a portion of the cutter-rod 98 and carriage 99, and from these views, Figs. 15 and 17, it will be seen that the lower end of the cutter 95 is bifurcated to straddle the rod 98 and is formed with pin-holes 108 to pass upon corresponding pins or projections 107 upon the plate 109, slidable upon the rod 98 and adapted to be moved against said cutter 95 by means of the threaded sleeve 110. Upon freeing the sleeve 110 from the plate 109 the latter may be freely moved from contact with the cutter 95, withdrawing its pins or projections 107 from the pin-holes 108 of said cutter and leave the latter to be withdrawn from the machine for regrinding or for any other desired purpose.

In Fig. 16 I illustrate, on an enlarged scale, a detached sectional view of that portion of the carriage 99 which is upon the ejector-rod 89, and therein it will be seen that the ejector-arm 97, adjacent to the carriage 99, is formed with an elongated sleeve 111, which is threaded at its outer end to receive the nuts 112, by which the sleeve 111 and its ejector-arm 97 are properly held within the carriage 99. The ejector-rod 89 is flattened along one surface, and the sleeve 111 is, in effect, keyed to said rod 89 by means of the screw 113, which engages the flat surface of the rod 89, as shown in Fig. 16. The sleeve 111 turns within the carriage 99, and said sleeve, with the ejector-arm 97, turns with the rod 89.

Referring again to Fig. 15, it will be seen that the plate 109 is keyed upon said rod, and that the cutter-rod 98 is grooved and thus the rotatory action of the rod 98 will cause the plate 109 and the cutter 95 to turn with it.

The means for giving to the cigar its rotatory motion, by which the loose portion of the wrapper at the head end of the cigar is caused, by the coöperation of other devices to be hereinafter described, to be wrapped around said end, having been described, I will proceed to a description of the thimble 67 and the parts connected and coöperating therewith by which the loose portion of the wrapper at the head end of the cigar is controlled, trimmed, and caused to be directly and properly wrapped upon and secured to the cigar.

The thimble 67, with its necessary parts, is shown on a reduced scale in Fig. 1, upon a larger scale in Fig. 3, and in detail in Figs. 6 to 11, inclusive, and in Figs. 20, 22, and 38. The thimble 67 is preferably of metal and contains the substantially conical recess 114 (see Figs. 3 and 20) to receive the head end of the cigar, and said thimble 67 is mounted upon a carriage 115 of any convenient shape, which is mounted on the dovetailed tongue 116', (see Figs. 5, 6, 14, and 38,) formed on a rigid part of the frame of the machine and serving as a guide for the carriage 115 during its usual movement toward and from the cigar-clamp 65. The thimble 67, carried by the carriage 115, is normally in the position shown in Fig. 3 in juxtaposition to the cigar-clamp 65; but when it is necessary for the ejector-arms 97 to discharge the finished cigar from the machine the thimble 67 and carriage 115 are moved outward toward the right, so that the recess 114 of said thimble 67 may pass from the head end of the cigar, thus leaving the cigar after the clamp 65 shall have opened free to be ejected by the ejector-arms 97. The means for moving the carriage 115 and thimble 67 toward the cigar-clamp 65 and maintaining said thimble and carriage in their adjusted position toward said cigar-clamp consist simply of the cam 116, whose side rim engages a roller 117, carried by said carriage 115, as shown in Fig. 3 and in detail in Fig. 14. The rim of the cam 116 during all the time that it is in direct contact with the roller 117 maintains the carriage 115 and thimble 67 at their inward position near the cigar-clamp 65, as shown in Fig. 3, and said carriage 115, carrying the thimble 67, is kept in contact with the arm of said cam 116 by means of a coiled spring 118, fastened at one end to the carriage and at the other end to a rigid portion of the frame of the machine. The cam 116 has a depressed portion or section 119 in its rim, (see Figs. 14, 33, and 34,) and when this depressed portion 119 of the cam 116 arrives at the roller 117 of the carriage 115 the spring 118 will draw said roller into said depressed portion 119, and thus at this time the carriage 115, with the thimble 67, is by means of said spring 118 drawn toward the right to an extent equal to said depression 119. The movement of the roller 117 into said depression 119 of the cam 116 has the effect of withdrawing the thimble 67 from the head of the cigar, so as to allow the cigar thereafter then finished to be ejected from the machine. Prior to the machine coming to a stop the depressed portion 119 of the cam 116 passes beyond the roller 117, and the projecting rim of said cam 116 again reaches the roller 117 and moves the carriage 115 and thimble 67 back to their normal operative position, and thus after the finished cigar has been ejected and before the machine comes to a final rest the thimble 67 will be restored to its normal position to receive the head end of the next cigar to be treated. The cam 116 is mounted upon the shaft 73 and revolves with that shaft, which carries the cam 94, hereinbefore described, (for opening the cigar-clamp 65,) as well as other cams, which will be hereinafter described.

The cam 116 is shown in detail in Figs. 33, 34, and 35, Fig. 33 showing one face of the cam with the rim which engages the wheel 117 connected with the carriage 115, and Fig. 35 showing the opposite face of this cam 116. Fig. 34 illustrates an edge view of the cam 116.

The thimble 67, having the conical recess 114, is provided with the concave leaf-spring 120, (shown in Fig. 20,) which leaf-spring is held at its outer end upon the flat rigid portion of the thimble 67, as shown in Fig. 20, and thence curves inward on a line substantially conforming to, but not normally contacting with, the walls of the recess 114. The form of the leaf-spring 120 represents the section of a cone, being smaller at its inner end than at its outer end and forming a gradual taper from its inner end outward toward its outer end. The leaf-spring 120 is of special importance in that by reason thereof the recess 114 of the thimble 67 is rendered self-adaptable to the varying sizes and conditions of the head ends of cigars. The spring 120 is of thin sensitive yielding material, so that it may move downward toward the walls of the recess 114 under the pressure of the head end of the cigar under treatment; but said spring 120 is to be sufficiently firm to maintain a yielding pressure against the head of the cigar, so as to keep the wrapper firmly in place and to insure the proper application of the loose portion of the wrapper to the end of the cigar. The spring 120 should not normally contact with the lower walls of the recess 114, since if it did it would have no upward pressure against the end of cigars and would not adapt itself to exert pressure against cigars varying in diameter at the said end. The form of the spring 120 is also such that its upward pressure is always exerted to keep the cigar-head in central alinement with the cigar. During the revoluble motion of the cigar-head within the recess 114 of the thimble 67 the cigar is turned (looking at Fig. 20) downward and around toward the left, and thus the inner edge of the spring 120 cannot tear or injure the cigar. The outer edge of the spring 120 laps over upon the thimble in the form of a securing plate or ear 121. Thus an unbroken smooth surface is presented to receive the cigar during its rotary motion downward and toward the left.

The thimble 67 is employed in conjunction with means for applying paste upon the cigar-wrapper, a cutter for trimming off that portion of the wrapper which may overhang the outer angular side of the thimble, means for lightly hammering the wrapper as it draws around the cigar, and means for turning downward the overhanging portion of the wrapper beyond the thimble, and these several parts will now be described. The knife 123 for trimming off the surplus portion of the wrapper overhanging the outer angular side of the thimble 67 is illustrated on an enlarged scale in Fig. 9, and it is carried by the rock-shaft 122, mounted upon the carriage 115, as shown in Figs. 3, 6, 7, 11, and 38. The said knife 123 is bifurcated to straddle the end of the shaft 122, as shown in Fig. 7, and is provided with the pin-holes 124 to pass upon the pins 125, secured to the disk 126, fastened upon said shaft 122. One end of the shaft 122 is provided with a head 127, Fig. 7, while the other end of said shaft freely enters a socket 128, formed in a bracket of the thimble 67. The shaft 122 is maintained in the normal position shown in Fig. 7 by means of the coiled spring 129, which keeps the disk 126 pressed against the knife 123, so that the pins 125, carried by said disk 126, shall normally remain within the pin-holes 124 of said knife 123, and thus normally the knife 123 is keyed to the shaft 122 by reason of the engagement of said pins 125 with the pin-holes 124.

Should it be desired for any reason to remove the knife 123 from the machine, it will be observed that to accomplish this result it will simply be necessary to pull on the head 127 of the shaft 122, and thus the shaft 122 will be drawn outward and the pins 125 will leave the pin-holes 124 and leave the knife 123 entirely free to be removed. This feature of the construction is desirable in that it renders it so easy and convenient to remove and replace the knife 123 without loosening any screws or disturbing the operative parts of the machine. The knife 123 is of thin material, and consequently the pins 125 are very short, and only a very slight movement outward of the shaft 122 is necessary to permit of the removal of the knife 123 or its replacement in position. The knife 123 has an oscillating motion imparted to it from the rock-shaft 122, and this motion is communicated to the shaft 122 from the segment-gear 130, (see Figs. 6, 7, and 38,) fulcrumed upon the shaft 131, also carried by the carriage 115. The segment 130 is maintained in its normal position (shown in Fig. 1) by a simple coiled spring 132 and is given a downward-and-outward motion to effect the proper movement of the knife 123 by means of the lever-arm 133, which engages an arm 134, formed on said segment. The downward-and-forward motion of the segment 130 effects, through the pinion-wheel 135, secured upon the shaft 122, a rotary motion to said shaft 122, and at such time and under such force the knife 123 performs its downward-and-forward cut along the outer angular side of the thimble 67 and removes the surplus portion of the wrapper overhanging the thimble. The knife 123 does not make one straight cut removing at once all of the wrapper overhanging the edge of the thimble 67; but, as illustrated in Figs. 6 and 9, said knife is formed with the several blades 136, which make proper cuts into the overhanging portion of the wrapper until, when the knife 123 has completed its movement, all of the surplus portion of the wrapper is removed. It is necessary, therefore, that the segment 130 shall have a regulated motion, so as not to instantly drive all of the blades 136 of the knife 123 instantly against the overhanging portion of the cigar-wrapper, and to this end I regulate the pressure of the lever-arm 133 against the upper arm 134 of the segment 130 by means of a cam 137, which is shown in detail in Figs. 30, 31, and 32, Fig. 30 showing one face of the cam, Fig. 32 the opposite face of the cam, and Fig. 31 an edge view of the cam. The cam 137 is shown in its operative position in Fig. 6, and said cam is formed with the depressed portion 138, the series of projecting portions 139, and the continuous even surface 140, and the lower end of the lever-arm 133 is, as shown in Fig. 6, provided with a roller against which the surfaces of said cam 137 move. The lever-arm 133 is fulcrumed upon the shaft 75 and has its lower end against the cam 137. While the depressed portion 138 of the cam 137 is moving against the lower end of the lever-arm 133, the upper end of said arm will be practically free of the segment-arm 134, and hence at this time the segment 130 will be in its normal position, (shown in Fig. 6,) with the blades 136 of the knife 123 in their upward position free of the cigar-wrapper. When, however, the series of projections 139 of said cam 131 reach the lower end of the lever-arm 133, the upper end of said lever-arm will act upon the segment 130 to turn the knife 123 downward and forward with varying thrusts, according to the variation in the projections 139 of the cam 137, and thus by a varied motion compelling the different blades 136 of the knife 123 to perform their function of removing the surplus wrapper in a manner not to interfere with the proper application of the wrapper to the end of the cigar without leaving thereon any small projecting pointed termination, such as will occur usually under many conditions of the tobacco-leaf where only a single blade is used for cutting off the edge of the cigar-wrapper. After the highest and last of the projections 139 reaches and passes against the lower end of the lever-arm 133 the knife 123 will have been turned to its extreme lower position and will have completely severed the surplus portion of the cigar-wrapper, and at this time the smooth even portion 140 of the cam 137 performs its function, which is to maintain during the rotary motion of the cigar-carrying frame 66 the knife 123 in its lower position, said knife 123 thus after having trimmed off the surplus cigar-wrapper being held in its lower position during the rolling of the cigar and serving to close any small opening which may be at the end of the recess 114 in the thimble 67. After the smooth even portion 140 of the cam 137 passes from contact with the lower end of the lever-arm 133 the latter will quickly descend into the depressed portion 138 of said cam 137, and thus allow the segment 130 to return to its normal upward position and the knife 123 to return to its normal upward position, as shown in Fig. 6. The depressed portion 138 of the cam 137 reaches the lower end of the lever-arm 133 before the machine comes to a stop, and thus when the machine does come to a stop the knife 123 is left in its upward position preparatory to its use upon the next cigar introduced to the machine. Different classes of leaf-tobacco seem to require different treatment, and thus in the construction of the cam 137 I provide upon one face the adjustable plate 141 and upon the opposite face the adjustable plate 142, (see Figs. 30, 31, and 32,) and the outer edges of these plates aid in forming the projections 139. By reason of the adjustment of the plates 141 and 142 I am enabled to vary the thrusts which the cam 137 imparts to the knife 123.

Upon the outer angular side of the thimble 67 is secured the steel plate 143, which affords a suitable edge for the knife 123 and between which (see Fig. 8) and the thin plate 144 the blades of the knife 123 have their movement.

The means for folding and guiding the projecting portion of the wrapper overhanging the outer angular side of the thimble 67 is illustrated in Figs. 1, 3, and 38, and consist of the hinged arm 145, (shown more clearly in Figs. 3 and 38,) which is carried by the arm 146, swiveled on an ordinary pin 147 to the hinged lug 200 and having the rearwardly-projecting arm 148 to be engaged by the cam 116, the detail of which cam is illustrated in Figs. 33, 34, and 35. The folder or guiding arm 145 is shown in its normal inoperative position in Figs. 3 and 38, the same being held in this position normally by means of the coiled spring 149, which acts to press the outer end of the arm 148 toward the cam 116. When the machine starts in motion, the cam 116 and arm 148 are in the position in which they are illustrated in Fig. 1, and the first operation of the cam 116 is to bring the curved edge 201 (see Fig. 34) against said arm 148 and with the effect of pressing the arm 148 rearward, and consequently of turning the front end of the folder-arm 145 frontward to a position in line with the front portion of the outer angular side of the thimble 67, but leaving the front end of said arm 145 at a higher elevation than the upper surface of said thimble. The continued motion of the cam 116 toward the arm 148 brings the elevated portions 150 and 151 against said arm 148, and this turns the rear end of said arm 148 upward, and consequently turns the front end of the arm 145 downward, this movement causing the front end of the arm 145 to move downward over the overhanging edge of the loose cigar-wrapper and turning the same evenly downward along the outer angular side of the thimble 67, the outer end of the arm 145 coming to a stop upon reaching a position slightly below the level of the upper surface of the thimble 67. The arm 145 is maintained a definite length of time in its lower position nearly horizontal with the upper edge of the thimble 67 by reason of the fact that the smooth edge 152 of the cam 116 is moving in contact with the end of the arm 148, but while the smooth edge 152 of the cam 116 is moving against the arm 148 and preserving the front end of the arm 145 about horizontally with the upper surface of the thimble 67 the shoulder 153, Fig. 38, on the arm 148 is being acted upon by the gradual taper incline 154 on said cam 116, and thus while in its aforesaid horizontal relation with the thimble 67 the outer end of the arm 145 is allowed to gradually recede rearward toward the rear portion of the thimble 67, thus gradually releasing the cigar-wrapper, so that the same may be properly turned inward around the head end of the cigar. This gradual inward-receding motion of the arm 145 takes place while the smooth portion 152 of the cam 116 is acting against the outer end of the arm 148 and while the incline 154 of said cam is allowing the rear end of the arm 148 under the pressure of the spring 202, Fig. 38, to gradually turn toward the front, and when the end of the smooth surface 152 has reached the end of the arm 148 the latter will under the force of the spring 149 pass down from said smooth surface 152 to the adjacent lower surfaces of the cam 116, and at this instant the downward motion of the arm 148 causes the folder-arm 145 to turn upward to its normal inoperative position, where it remains until the next cigar to be treated is introduced to the machine. The rearward horizontal receding motion of the folder-arm 145 takes place while the cigar is being rolled, and its final upward motion to its normal inoperative position takes place before the revoluble frame 66 has come to a stop and before the knife 123 has ascended to its normal position. The arms 148 and 145 being connected together, as by a frame, may have a hinged movement under the action of the cam 116 and also a pivotal or axial motion on the pivot 147, and thus the one cam 116 may be utilized to effect the motion above described for the folder-arm 145. The arm 145 aids in controlling the loose overhanging portion of the cigar-wrapper, in keeping said wrapper from being wrinkled while being drawn into the thimble 67, in holding the wrapper smoothly while being operated upon by the knife 123, and in creating just enough tension on said leaf to insure its proper inward travel in proper condition to and around the head end of the cigar. The arm 145 is hinged to the arm 148, and the inclination and position of the arm 145 may be adjusted at will by means of the adjusting-screw 203, (see Fig. 38,) whose point presses against the arm 146. By screwing the screw 203 downward it will cause the front end of the arm 145 to assume a more elevated position.

The means for hammering and directing the paste to the upper surface of the wrapper fed onto the cigar comprises a pivotally-mounted arm 155, which is connected with the paste mechanism by a flexible tube 156 and is illustrated in position in Figs. 1, 5, and 6 and on an enlarged scale and in greater detail in Figs. 8, 10, and 20. I will for convenience designate the arm 155 as a "hammer-arm," and upon reference to Figs. 6 and 8 it will be seen that this arm is mounted upon the outer end of the shaft 157, which, as shown in Fig. 7, is in alinement with the shaft 131 and is mounted in a bracket which rises from the thimble 67. In Fig. 7 the hub portion of the hammer-arm 155 is illustrated upon said shaft 157, and in this figure I illustrate a usual coiled spring 159, whose office is to place the outer hollow end of the arm 155 under a normal upward tension. The arm 155 is adapted to have an oscillatory motion and is provided with the rearwardly-extending arm or extension 160, which during the operation of the machine is acted upon by the pivoted lever-arm 161, mounted upon the shaft 75 and engaged at its lower end by the cam 163, mounted upon the shaft 73, as shown in Figs. 2 and 3. The detail of the cam 163 is shown in Figs. 28 and 29, Fig. 28 being a side elevation of same and Fig. 29 an edge view of same. The cam 163 has an irregular surface, as shown in Fig. 28, which imparts to the lever-arm 161 a varied motion, which will be understood by a consideration of the various parts of the cam 163. In its normal position the hammer-arm 155 is in a normal upward position, as shown in Fig. 6, and at this time the lower end of the lever-arm 161 is being held in its position necessary to keep the outer end of the hammer-arm 155 upward by the greater projecting portion 164 of the cam 163, and while this greater projecting portion 164 of the cam 163 is moving against the lower end of the lever-arm 161 the front end of the hammer-arm 155 will be maintained in its upper normal inoperative position. Almost immediately, however, upon the starting of the machine it is desirable that the hammer-arm 155 shall descend to the lower position shown in Figs. 8 and 10, and consequently almost immediately after the starting of the machine the lower end of the lever-arm 161 will ride off the end of the projection 164 of the cam 163 and will reach the serrations or projections 165 of said cam 163, and while these serrations 165 of the cam are moving against the lever-arm 161, the latter being spring-pressed, the hammer-arm 155 will be caused to have a quick oscillating or hammering motion, and the purpose of this operation is to cause the lower edge of the hammer-arm 155 to lightly, but with some firmness, hammer the tobacco-wrapper as the latter is drawn around the end of the cigar, whereby said cigar-wrapper is rendered incapable of resisting its application smoothly, evenly, and firmly to the head of the cigar. The lower end of the hammer-arm 155, which contacts with the wrapper on the cigar during the oscillating motion of said arm, is narrow in width, especially at its smaller end, as indicated in Figs. 10 and 20, and in actual use said lower end by hammering on the wrapper while the cigar is turning or rotating and drawing the wrapper upon itself overcomes any tendency of the wrapper to twist around the end of the cigar or become irregular on the end of the cigar and compels the wrapper, as in a hand-made cigar, to lie snugly and evenly in proper close folds around the end of the cigar. The cam 163 is also provided adjacent to the serrations 165 with the smooth portion 166, and the purpose of this portion 166 is to hold the lower end of the hammer-arm 155 slightly free of the thimble 67 during a brief period of time, and this is followed by the lower end of the lever-arm 161 passing to the reduced portion 167 of the cam 163 and permitting the front end of the hammer-arm 155 to descend more closely against the cigar and remain there during a part of the rotary motion of the cigar in order to aid in burnishing and completing the latter. As the cam 163 continues to rotate, the reduced portion 167 thereof will leave the lower end of the lever-arm 161, and the projecting portion 164 of said cam 163 will again reach the lever-arm 161 and cause the front end of the hammer-arm 155 to reascend to its normal inoperative position. The lower edges of the hammer-arm 155 are curved to substantially fit and form a part of the inner end of the recess 114 in the thimble 67, as shown in Fig. 20. The hammer-arm 155 is also used as a means of directing the paste to the upper surface of the cigar-wrapper, and to this end the hammer-arm 155 is made hollow, as shown in Fig. 10, so that at its upper rear portion it may receive one end of the flexible paste-tube 156 and at its lower end, as at 168, it may direct the paste to the cigar-wrapper. The paste is supplied to the paste-tube 156 by means which will presently be described, and since the description last above given completes the description of the parts directly connected with the thimble 67 and carriage 115 I will now refer to the means illustrated for mounting the thimble 67 upon said carriage 115 and then describe the paste-supplying mechanism.

The means for removably fastening the thimble 67 to the carriage 115 is illustrated in Figs. 3, 6, 8, 21, 22, and 38, and referring to Figs. 8 and 22 it will be seen that the bottom portion of the thimble 67 contains a dovetail groove 169, having an interior recess 170, as shown in Fig. 22, and that portion of the carriage 115 which directly receives the thimble 67 is formed with the lugs 171, (see Fig. 21,) upon which the dovetail groove 169 passes until the flange 172 of the thimble (shown in Fig. 38) contacts with the edge of the carriage 115, and thereby stops the thimble in the proper position. After the thimble 67 has reached its proper position upon the carriage 115 it is there held by an ordinary button 173, located upon the screw 174 and fastened against the flange 172 of the thimble 67 by said screw 174. Upon loosening the screw 174 and turning the button 173 downward thereon from the flange 172 the thimble 67 is left free to be drawn outward toward the front upon the dovetail lugs 171 and then within the dovetail groove 169 of said thimble. The recess 170 in the bottom of the thimble 67, as shown in Fig. 22, is to enable the operator in the minimum amount of space and with the minimum labor to introduce the thimble 67 upon the lugs 171 of the carriage 115, and in this introducing the thimble 67 upon the carriage 115 the thimble 67 is placed directly down upon the carriage 115, so that the outer lug 171 will pass directly into the recess 170, thus placing the thimble half-way upon the carriage by a direct motion, and thus far not giving to the carriage any slidable motion. After the thimble has been placed directly upon the carriage, so that the recess 170 passes directly downward over the outer lug 171, (see Figs. 21 and 22,) the thimble is then moved inward and the inner lug 171 then passes into the inner end of the dovetail groove 169 and the outer lug 171 passes into the outer end of the groove 169, and thus by short inward sliding motion the thimble 67 is moved into position and is there secured by the screw 174 and button 173. Upon desiring to move the thimble 67 from the carriage 115 the screw 174 is loosened, the button 173 turned downward upon the screw 174, and the thimble 67 drawn outward toward the front until the outer lug 171 of the carriage is within the recess 170 of the thimble, and at this time the thimble may be lifted directly upward from the carriage. Thus only a short outward movement of the thimble is required before it may be lifted directly upward from the carriage 115, and thereby the important item of space in the application of the thimble to and its removal from the carriage 115 is saved and time and labor in this operation are also saved.

The mechanism for holding and impressing the paste into the flexible tube 156 and expressing the paste from the aperture 168 at the lower end of the hammer-arm 155 is more clearly illustrated in Figs. 23, 24, and 25, although this mechanism is also illustrated in Figs. 1, 2, and 5. The outer end of the flexible tube 156 is secured to the discharge end of the paste-cylinder 175, which is provided with an interior thread, as shown in Fig. 24, and is held within the tubular bearing 176 by means of a screw 177. Within the internally-threaded cylinder 175 will be placed the paste 178 and also the threaded piston 179, whose piston-rod 180 is provided with the longitudinal groove 181, which, as shown in Fig. 24, is engaged by a key 182, formed on the interior and at the inner end of the rotatory sleeve 183, which is mounted in a bearing 184 and carries at its outer end the ratchet-wheel 185. (Clearly shown in Fig. 23.) The rotary motion of the sleeve 183 imparts a rotary motion to the piston-rod 180 and piston 179, and since the piston 179 is threaded and engages the interior thread of the cylinder 175 the said piston will during its rotary motion be caused to travel inward toward the outer end of the cylinder 175 and in doing so force the paste from said cylinder 175 into and through the tube 156 to the hammer-arm 155. The means for imparting the rotary motion to the sleeve 183 and through said sleeve to the piston-rod 180 and piston 179 is illustrated in Figs. 23 and 24, in which it will be seen that upon the sleeve 183 there is loosely placed a collar 186, whose upper portion carries the hinged pawl 187, engaging the ratchet-wheel 185, and the lower portion of which collar 186 is secured by a pin 188 to the adjustable head 189, carried upon the screw 190, (see Fig. 23,) whose lower end engages a threaded hub 191 upon the arm 192, whose lower end is, as shown in Fig. 23, guided upon the shaft 73, and which end, near said shaft, is provided with the roller 193. The arm 192 is adapted to have a reciprocating motion, being moved in a downward direction by means of the coiled spring 194 (see Fig. 24) and in its upward direction by the cam 195, secured upon the shaft 73. When the cam 195 during the rotation of the shaft 73 moves against the roller 193, carried by the arm 192, it will push said arm upward toward the ratchet-wheel 185 and in so doing will turn the collar 186 and cause the pawl 187 to move the ratchet-wheel a definite predetermined distance. This movement of the ratchet-wheel 185 operates to turn the entire sleeve 183, together with the piston-rod 180 and piston 179, and thus with each upward movement of the arm 192, under the action of the cam 195, the piston 179 is caused to move a limited quantity of paste through the paste-tube 156 and out through the aperture 168 in the hammer-arm 155, the effect being that this limited quantity of paste will be deposited upon the cigar-wrapper to be applied to the head of the cigar. After the cam 195 passes beyond the roller 193, carried by the arm 192, the spring 194 will restore the arm 192 and the collar 186 to their former normal position, (shown in Fig. 23,) and at this time the additional pawl 196 will prevent the ratchet-wheel 185 from having any back motion due to the contact of the collar 186 therewith. The extent of the throw of the ratchet-wheel 185 may be regulated by the adjustment of the screw 190, and thus it is within the power of the operator to control the amount of paste which with each rotation of the shaft 73 will be expressed from the lower end of the hammer-arm 155.

Upon reference to Figs. 24 and 25 it will be seen how convenient a construction of paste mechanism is presented in this application. The sleeve 183 is simply loosely clamped within the bearing 184, and the cylinder 175, carrying the paste 178, the piston 179, and the piston-rod 180 are simply slipped into the tubular bearing 176, with the groove 181 of the piston-rod passing upon the key 182 of the sleeve 183. After the paste-cylinder 175 has been moved to position through the tubular bearing 176 it will be given a slight turn, so that its lug 197, which has passed through the groove 198 of said bearing 177, will be drawn laterally into the recess 199, as shown in Fig. 25, in order that, as by a bayonet-lock, the said cylinder 175 may be secured in position. The cylinder 175 is then further secured by means of the screw 177. When it is desired to load the cylinder 175 with paste, it is simply necessary to loosen the screw 177 and give the cylinder 175 a slight turn, so that its lug 197 will pass into the groove 198, and thereupon the cylinder 175, carrying the piston 179 and its rod 180, may be drawn directly from the tubular bearing 176 and be recharged with paste in a well-known manner.

The various parts of the machine made the subject of this application have been so thoroughly described hereinbefore as to their construction, mode of operation, and timing that it would seem unnecessary to further discuss the operation of the machine in any great detail.

Fig. 3 illustrates the work the machine performs. The cigar to be headed is wrapped by hand or by any of the well-known methods, the wrapper at the head end of the cigar being left free to be wound upon the cigar to complete the head thereof by the axially rotatory motion of the cigar after the latter has been introduced to the machine illustrated. The cigar is held by the clamp 65, forming a part of the rotatory frame 66, which has a rapid rotary motion, while the head end of the cigar is within the recess 114 of the thimble 67. After the rotatory frame 66 has made about four rotations and has come to a stop the coöperating cutters 95 and 96 trim the tuck end of the cigar, the thimble 67 recedes from the head end of the cigar, the clamp 65 opens to release the cigar, and the ejector-arms 97 throw the cigar forward toward the operator and into any receptacle placed to receive it, as indicated by the dotted lines in Fig. 3. The rotatory frame 66 has a rapid rotary motion and comes to a stop before the auxiliary driving-shaft 45 is stopped in order that after said frame 66 has become stationary the said auxiliary driving-shaft 45 may impart the proper movement to the tuck-cutter knife 95, clamp 65, and ejector-arms 97 before it, said auxiliary driving-shaft 45, reaches the end of its rotation. The thimble 67 is provided within its recess 114 with the spring 120, which is so shaped as to press against the tapered end of the cigar, and, as hereinbefore described, is an important factor in properly applying under the varying conditions which exist in the manufacture of cigars the wrapper to the head end of the cigar. The knife 123, having the series of varying blades 136, is important in that thereby a varying cut may be given to the overhanging portion of the cigar-wrapper and the latter be rendered capable of being applied to the end of the cigar without leaving any projecting point of the wrapper at the extreme point of the head end of the cigar. The hammer-arm 155 is also of importance in that by reason thereof the wrapper while being drawn around the head end of the cigar may be lightly though firmly hammered and its fiber to some extent be thereby deadened, so that said wrapper after being applied to the cigar will have no tendency to leave the same. The hammer-arm 155 is also of importance in that through this arm the paste may be properly applied to the wrapper and that the lower end of the arm may be employed to burnish or press against the cigar during the final rotary motion of the latter in completing the head end of the cigar. The folder-arm 145 is likewise of importance in that by acting upon the overhanging portion of the leaf in the manner hereinbefore described all wrinkling and puckering of the leaf are prevented and the latter is nicely and evenly guided into the recess 114 of the thimble 67. While the form and construction of the various parts of the machine, as hereinbefore specifically pointed out, are regarded as important and novel, I do not limit the invention otherwise than expressed in the claims to such form and construction of the parts nor to the various details above described.

The form, construction, and arrangement of the various parts may be modified in many respects without departing from the invention sought to be protected hereby.

What I claim as my invention, and desire to secure by Letters Patent, is—

1. In a cigar-making machine, the rotatory frame and clamp for holding the cigar, combined with the thimble having the recess to receive the head end of the cigar, and the spring within said thimble and substantially conforming to the surfaces of the end of the cigar, said spring being adapted to exert a yielding pressure against said end of the cigar; substantially as set forth.

2. In a cigar-making machine, the rotatory frame and clamp for holding the cigar, combined with the thimble having the recess to receive the head end of the cigar and being open at one side, and the spring 120 extending into and curving along the surfaces of said thimble and substantially conforming to the outline of a section of said recess, said spring having the securing-lip at its outer edges whereby the spring may be removably secured to the thimble; substantially as set forth.

3. In a cigar-making machine, the rotatory frame and clamp for holding the cigar, combined with the thimble having the recess to receive the head end of the cigar, and means for hammering the cigar-wrapper as it is drawn around said end of the cigar; substantially as set forth.

4. In a cigar-making machine, the rotatory means for holding the cigar, combined with the thimble having the recess to receive the head end of the cigar, said recess having a yielding spring-surface adapted to exert pressure against the head end of the cigar during the rotary motion of the latter within said recess; substantially as set forth.

5. In a cigar-making machine, the rotatory means for holding the cigar, combined with the thimble having the recess to receive the head end of the cigar, and means for hammering the leaf while being drawn around said end of the cigar; substantially as set forth.

6. In a cigar-making machine, the rotatory means for holding the cigar, combined with the thimble having the recess to receive the head end of the cigar, the pivotally-mounted hammer-arm 155 carried by said thimble, and means substantially as described for imparting an oscillating motion to said arm 155 whereby the latter is caused to hammer the wrapper while being drawn around the head end of the cigar; substantially as set forth.

7. In a cigar-making machine, the rotatory means for holding the cigar, and the thimble having the recess to receive the head end of the cigar, combined with the pivotally-mounted hammer-arm carried by said thimble and having the opening for the passage of the paste, paste mechanism for moving the paste through said hammer-arm, and means for oscillating said arm, whereby said arm is utilized to deliver the paste upon the wrapper and is also caused to hammer the wrapper while the latter is being drawn around the head end of the cigar; substantially as set forth.

8. In a cigar-making machine, the rotatory means for holding the cigar, combined with the thimble having the recess to receive the head end of the cigar, and having at its lower side the dovetail groove 169 and interior recess 170, and the carriage receiving said thimble and having the dovetail lugs 171 and button 173, said lugs 171 being adapted to said groove 169 and recess 170; substantially as set forth.

9. In a cigar-making machine, the rotatory means for holding the cigar, combined with the thimble having the recess to receive the head end of the cigar, and the knife for trimming off the surplus wrapper overhanging the outer edge of said thimble, said knife having the series of blades, and means for imparting an intermittent motion to said knife; substantially as set forth.

10. In a cigar-making machine, the rotatory means for holding the cigar, and the thimble having the recess to receive the head end of the cigar, combined with the knife having the series of blades differing in character for trimming the surplus wrapper overhanging the outer edge of said thimble, and means for imparting to said knife an intermittent motion so that said blades may make individual cuts into said wrapper; substantially as set forth.

11. In a cigar-making machine, the rotatory means for holding the cigar, and the thimble having the recess to receive the head end of the cigar, combined with the knife for trimming the surplus wrapper overhanging the outer edge of the said thimble and having the apertures 124, the shaft 122 having the disk 126 provided with pins 125 for engaging said apertures, and the spring on said shaft for retaining said disk against said knife and said pins within said apertures, whereby said knife is detachably held against said thimble; substantially as set forth.

12. In a cigar-making machine, the rotatory means for holding the cigar, and the thimble having the recess for receiving the head end of the cigar, combined with the knife having the several blades for trimming the surplus wrapper overhanging the edge of said thimble and being provided with the apertures 124, the shaft 122 having the disk 126 and pins 125 to engage said knife, the spring on said shaft for retaining said pins 125 within said apertures 124, the pinion-wheel 135 on said shaft, the segment 130 engaging said pinion-wheel, and means for actuating said segment to impart a rotary motion to said pinion-wheel shaft and knife; substantially as set forth.

13. In a cigar-making machine, the rotatory means for holding the cigar, and the thimble having the recess to receive the head end of the cigar, combined with the knife for trimming the wrapper overhanging the outer edge of said thimble, means for actuating said knife, the plate 144 at the outer side of said thimble and between which and said thimble the cutting edge of said knife passes, and means for folding downward at the outer side of said plate 144 the overhanging portion of the cigar-wrapper; substantially as set forth.

14. In a machine for making cigars, the rotatory means for holding the cigar, and the thimble having the recess to receive the head end of the cigar, combined with the knife for trimming the surplus wrapper overhanging the edge of the thimble, the plate 144 at the outer side of the thimble and between which and the thimble the cutting portion of said knife passes, the pivoted folder-arm 145 at the outer side of said thimble, and means for actuating said folder-arm to move downward against the wrapper overhanging the outer edge of said thimble, and then moving said arm upward and out of the way of said thimble; substantially as set forth.

15. In a cigar-making machine, the rotatory means for holding the cigar, and the thimble having the recess to receive the head end of the cigar, combined with the trimming-knife at the outer edge of the said thimble, the folder-arm 145 at the outer side of said thimble, means for adjusting the normal position of said folder-arm, and means for moving said folder-arm from its normal position to a position over that portion of the wrapper overhanging the outer edge of the thimble, then depressing said arm so as to move the overhanging portion of the wrapper downward and then returning said folder-arm to its normal position; substantially as set forth.

16. In a cigar-making machine, the rotatory frame, the clamp connected to rotate with said frame and adapted to hold the cigar, said clamp comprising the arms 84, 85, mounted on different pivots and geared to have a simultaneous motion, the spring for imparting to said clamp-arms a normal tension toward one another, and means for opening said clamp-arms to receive the cigar and then releasing the same to close upon the cigar, combined with the thimble having the recess to receive the head end of the cigar; substantially as set forth.

17. In a cigar-making machine, the semi-cylindrical rotatory frame, the gearing at the outer end of said frame, means for actuating said gearing to rotate said frame, and the clamp for holding the cigar secured to the inner end of said frame, said clamp comprising the arms 84, 85 mounted on independent pivots and geared to have a simultaneous motion, the spring for normally drawing said clamp-arms to closed position, and means for opening said clamp-arms to receive the cigar and then releasing the same to close upon the cigar, combined with the thimble having the recess to receive the head end of the cigar held by said clamp; substantially as set forth.

18. In a cigar-making machine, the rotatory frame and clamp for holding the cigar, the thimble having the recess to receive the head end of the cigar, a knife for trimming the wrapper at the outer edge of said thimble, and means for actuating said rotatory frame and said knife, combined with the rods 89, 98, carried by said rotatory frame, the ejector-arms on said rod 89, the carriage on said rods 89, 98, the tuck-cutter knife on said rod 98, means for actuating said rods 89, 98, the knife 96 set in said carriage, and the adjusting-screw 100 for said knife 96; substantially as set forth.

19. In a cigar-making machine, the rotatory frame and clamp for holding the cigar, the thimble having the recess to receive the head end of the cigar, the knife for trimming the wrapper at the outer edge of said thimble, and means for actuating said knife and said rotatory frame, combined with the rods 89, 98 carried by said frame, the ejector-arms on said rod 89, the adjustable carriage on said rods 89, 98, the knife carried by said carriage, the tuck-cutter knife 95 on said rod 98 and having the apertures 108, the disk 109 keyed on said rod 98 and having the pins 107 to enter the apertures 108 of said knife 95, the screw-sleeve on said rod 98 and engaging said carriage and said disk 109, and means for actuating said rods 89, 98; substantially as set forth.

20. In a cigar-making machine, the rotatory means for holding the cigar, and the thimble having the recess to receive the head end of the cigar, combined with the paste-cylinder 175, the tubular conveying means leading from said cylinder to said thimble for directing the paste to the cigar-wrapper, the threaded piston 179 engaging the screw-thread on the interior walls of said cylinder 175, the grooved piston-rod connected with said piston, the rotatory sleeve 183 having the key 182 to engage said piston-rod, the ratchet-wheel 185 on the end of said sleeve 183, the loose collar 186 on said sleeve, the pawl 187 carried by said collar and engaging said ratchet, the arm 192 connected with an extending arm of said collar, and cam mechanism for moving said arm 192 to actuate said ratchet-wheel and its connected parts; substantially as set forth.

21. In a cigar-making machine, the rotatory means for holding the cigar, and the thimble having the recess to receive the head end of the cigar, combined with the paste-cylinder 175, the tubular conveying means leading from said cylinder to said thimble for directing the paste to the cigar-wrapper, the threaded piston 179 engaging the screw-thread on the interior walls of said cylinder 175, the grooved piston-rod connected with said piston, the rotatory sleeve 183 having the key 182 to engage said piston-rod, the ratchet-wheel 185 on the end of said sleeve 183, the loose collar 186 on the said sleeve, the pawl 187 carried by said collar and engaging said ratchet, the threaded screw 190 carried by an extending arm of said collar, the rod 192 receiving the end of said screw and carrying the roller 193, and the cam 194 for coming against said roller to impart an intermittent motion to said ratchet-wheel; substantially as set forth.

Signed at New York, in the county of New York and State of New York, this 14th day of March, A. D. 1899.

JOHN W. DUNN.

Witnesses:
CHAS. C. GILL,
E. JOS. BELKNAP.